US012794126B2

(12) United States Patent
Lan et al.

(10) Patent No.: US 12,794,126 B2
(45) Date of Patent: Nov. 10, 2026

(54) ANTENNA ON GLASS WITH THROUGH GLASS VIA SIDEWALL SHIELDING STRUCTURE

(71) Applicant: QUALCOMM Incorporated, San Diego, CA (US)

(72) Inventors: Je-Hsiung Lan, San Diego, CA (US); Sang-June Park, San Diego, CA (US); Jonghae Kim, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 353 days.

(21) Appl. No.: 18/601,578

(22) Filed: Mar. 11, 2024

(65) Prior Publication Data

US 2024/0313405 A1 Sep. 19, 2024

Related U.S. Application Data

(60) Provisional application No. 63/490,172, filed on Mar. 14, 2023.

(51) Int. Cl.
*H01Q 9/04* (2006.01)
*H01Q 1/38* (2006.01)

(52) U.S. Cl.
CPC ............. *H01Q 9/0407* (2013.01); *H01Q 1/38* (2013.01)

(58) Field of Classification Search
CPC .... H01Q 9/065; H01Q 9/0407; H01Q 13/106; H01Q 13/206; H01Q 13/02; H01Q 15/142; H01Q 9/285; H01Q 9/40; H01Q 9/04; H01Q 1/38; H01Q 1/52; H01Q 1/2283; H01Q 1/1271; H01Q 13/025; H01Q 13/10; H01Q 13/084; H01Q 13/103; H01Q 15/0086; H01Q 15/14; H01Q 15/0013
See application file for complete search history.

(56) References Cited

U.S. PATENT DOCUMENTS

| | | | | |
|---|---|---|---|---|
| 11,164,818 | B2 * | 11/2021 | Pietambaram | H10W 70/611 |
| 11,387,572 | B2 * | 7/2022 | Tamakita | H01Q 9/04 |
| 11,594,804 | B2 * | 2/2023 | Lan | H01Q 1/38 |

(Continued)

OTHER PUBLICATIONS

International Search Report and Written Opinion—PCT/US2024/019589—ISA/EPO—Jun. 26, 2024.

(Continued)

*Primary Examiner* — Nikolay K Yushin
(74) *Attorney, Agent, or Firm* — Muncy, Geissler, Olds & Lowe, P.C

(57) ABSTRACT

Disclosed are techniques for a structure of an antenna apparatus. In an aspect, an antenna apparatus includes a glass substrate having an upper surface, a lower surface, and a side portion; a first conductive structure on the upper surface of the glass substrate; a second conductive structure on the lower surface of the glass substrate; and a through-glass via (TGV) structure including a first conductive film on a sidewall of a first TGV hole, the first conductive film being configured to couple the first conductive structure to the second conductive structure, wherein the side portion includes a plurality of metalized recess structures having recess sidewalls and a plurality of second conductive films respectively on the recess sidewalls of the plurality of metalized recess structures, each recess sidewall having a shape corresponding to a partial TGV hole.

20 Claims, 16 Drawing Sheets

(56) References Cited

U.S. PATENT DOCUMENTS

| | | | |
|---|---|---|---|
| 2013/0050226 | A1 | 2/2013 | Shenoy et al. |
| 2020/0312767 | A1* | 10/2020 | Pietambaram ...... H10W 70/611 |
| 2021/0126380 | A1* | 4/2021 | Tamakita ................. H01Q 9/04 |
| 2021/0184362 | A1 | 6/2021 | Hong Loh et al. |
| 2021/0399404 | A1* | 12/2021 | Lan ...................... H01Q 1/1285 |
| 2022/0059916 | A1 | 2/2022 | Hashimoto |

OTHER PUBLICATIONS

Tong K.H., et al., "The Evolution of Organic Solderability Preservative (OSP) Process in PCB Application", 2013 8th International Microsystems, Packaging, Assembly and Circuits Technology Conference (IMPACT), IEEE, Oct. 22, 2013, pp. 43-46, XP032545071, Abstract and Introduction.

* cited by examiner

ANTENNA ON GLASS WITH THROUGH GLASS VIA SIDEWALL SHIELDING STRUCTURE

CROSS-REFERENCE TO RELATED APPLICATIONS

The present application for patent claims the benefit of U.S. Provisional Application No. 63/490,172, entitled "ANTENNA ON GLASS WITH THROUGH GLASS VIA SIDEWALL ELECTROMAGNETIC INTERFERENCE SHIELDING," filed Mar. 14, 2023, assigned to the assignee hereof, and expressly incorporated herein by reference in its entirety.

TECHNICAL FIELD

The present disclosure generally relates to an antenna apparatus, and more particularly, to an antenna on glass die with a through glass via (TGV) sidewall shielding structure.

BACKGROUND

Integrated circuit technology has achieved great strides in advancing computing power through miniaturization of active components. The package devices can be found in many electronic components, including processors, servers, radio frequency (RF) integrated circuits, etc. Packaging technology becomes cost-effective in high pin count devices and/or high production volume components.

Additionally, an antenna on glass (AOG) die may be used to form an antenna in radio frequency (RF) frontend circuitry (e.g., used in millimeter wave (mmWave)), where the RF frontend circuitry may be further mounted on a package substrate together with other electrical components. However, without a proper shielding structure (e.g., for electromagnetic interference (EMI) shielding), an antenna based on an AOG die may still be affected by EMI from adjacent components, which may cause degraded antenna gain, throughput, and/or bandwidth.

Accordingly, there is a need for an improved AOG die and a method of making such AOG die that can provide a shielding structure in order to address the above-noted issues.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, an antenna apparatus includes a glass substrate having an upper surface, a lower surface, and a side portion surrounding the glass substrate and connecting the upper surface and the lower surface; a first conductive structure on the upper surface of the glass substrate; a second conductive structure on the lower surface of the glass substrate; and a through-glass via (TGV) structure including a first conductive film on a sidewall of a first TGV hole, the first TGV hole being defined within the glass substrate and extending from the upper surface of the glass substrate to the lower surface of the glass substrate, and the first conductive film being configured to couple the first conductive structure to the second conductive structure, wherein the side portion includes a plurality of metalized recess structures, the plurality of metalized recess structures having recess sidewalls connecting the upper surface and the lower surface and a plurality of second conductive films respectively on the recess sidewalls of the plurality of metalized recess structures, each recess sidewall of the plurality of metalized recess structures having a shape corresponding to a partial TGV hole.

In an aspect, a method of fabricating an antenna apparatus includes forming a first conductive structure on an upper surface of a glass substrate, the glass substrate having the upper surface, a lower surface, and a side portion surrounding the glass substrate and connecting the upper surface and the lower surface; forming a second conductive structure on the lower surface of the glass substrate; and forming a through-glass via (TGV) structure including a first conductive film on a sidewall of a first TGV hole, the first TGV hole being defined within the glass substrate and extending from the upper surface of the glass substrate to the lower surface of the glass substrate, and the first conductive film being configured to couple the first conductive structure to the second conductive structure, wherein the side portion includes a plurality of metalized recess structures, the plurality of metalized recess structures having recess sidewalls connecting the upper surface and the lower surface and a plurality of second conductive films respectively on the recess sidewalls of the plurality of metalized recess structures, each recess sidewall of the plurality of metalized recess structures having a shape corresponding to a partial TGV hole.

In an aspect, an electrical device includes one or more processor; and an antenna apparatus coupled to the one or more processor, wherein the antenna apparatus comprises: a glass substrate having an upper surface, a lower surface, and a side portion surrounding the glass substrate and connecting the upper surface and the lower surface; a first conductive structure on the upper surface of the glass substrate; a second conductive structure on the lower surface of the glass substrate; and a through-glass via (TGV) structure including a first conductive film on a sidewall of a first TGV hole, the first TGV hole being defined within the glass substrate and extending from the upper surface of the glass substrate to the lower surface of the glass substrate, and the first conductive film being configured to couple the first conductive structure to the second conductive structure, wherein the side portion includes a plurality of metalized recess structures, the plurality of metalized recess structures having recess sidewalls connecting the upper surface and the lower surface and a plurality of second conductive films respectively on the recess sidewalls of the plurality of metalized recess structures, each recess sidewall of the plurality of metalized recess structures having a shape corresponding to a partial TGV hole.

Other objects and advantages associated with the aspects disclosed herein will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure.

Figure 1A:
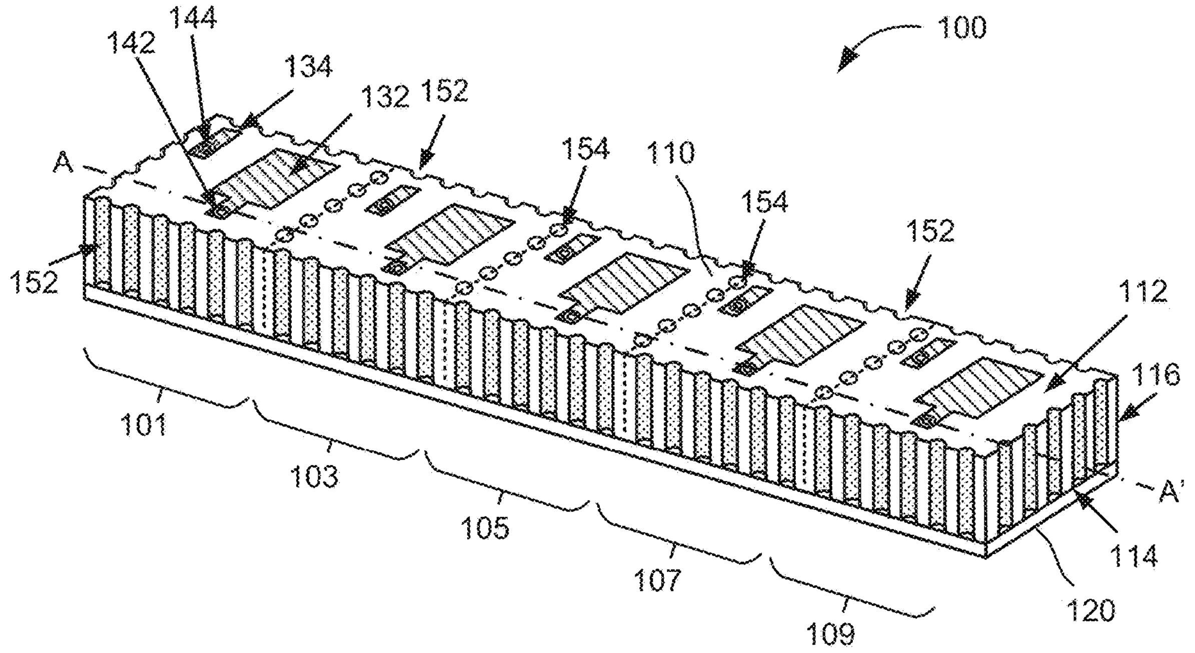
FIG. 1A is a simplified perspective view of an example antenna on glass (AOG) die, according to aspects of the disclosure.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to an antenna apparatus (e.g., an antenna on glass (AOG) die) that includes a plurality of metalized recess structures formed on a side portion of the glass substrate of the antenna apparatus, as well as a method of forming the antenna apparatus with the metalized recess structures.

Particular aspects of the subject matter described in this disclosure can be implemented to realize one or more of the following potential advantages. In some examples, the process of forming the metalized recess structures may be integrated with the process of forming the TGV structures and thus may not significantly increase the complexity of the fabrication process. Meanwhile, the EMI shielding provided by the metalized recess structure may improve the antenna performance (e.g., antenna gain, throughput, and/or bandwidth).

The words “exemplary” and/or “example” are used herein to mean “serving as an example, instance, or illustration.” Any aspect described herein as “exemplary” and/or “example” is not necessarily to be construed as preferred or advantageous over other aspects. Likewise, the term “aspects of the disclosure” does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, “logic configured to” perform the described action.

FIG. 1A is a simplified perspective view of an example antenna on glass (AOG) die 100, according to aspects of the disclosure. As a simplified perspective view for illustrating a non-limiting example, various features of the AOG die 100 may be simplified or not depicted in FIG. 1A. In some aspects, the AOG die 100 may be incorporated into an electrical device, such as a music player, a video player, an entertainment unit; a navigation device, a communications device, a mobile device, a mobile phone, a smartphone, a personal digital assistant, a fixed location terminal, a tablet computer, a computer, a wearable device, a laptop computer, a server, an internet of things (IoT) device, a device in an automotive vehicle, or other applicable apparatus.

As shown in FIG. 1A, the AOG die 100 may include one or more antenna components, such as antenna components 101, 103, 105, 107, and 109 (with dotted lines indicating the boundaries therebetween in FIG. 1). In some aspects, each one of the antenna components 101, 103, 105, 107, and 109 may share a similar configuration.

In some aspects, the AOG die 100 may include a glass substrate 110 and a metallization structure 120 under the glass substrate 110. The glass substrate 110 may have an upper surface 112, a lower surface 114, and a side portion 116 surrounding the glass substrate 110 and connecting the upper surface 112 and the lower surface 114. In some aspects, a first conductive layer may be disposed on the upper surface 112 and may include various conductive structures, such as a conductive structure 132 configured as an antenna element (e.g., a patch antenna in this example) and a conductive structure 134 configured as a conductive path of the antenna component 101.

Figure 1B:
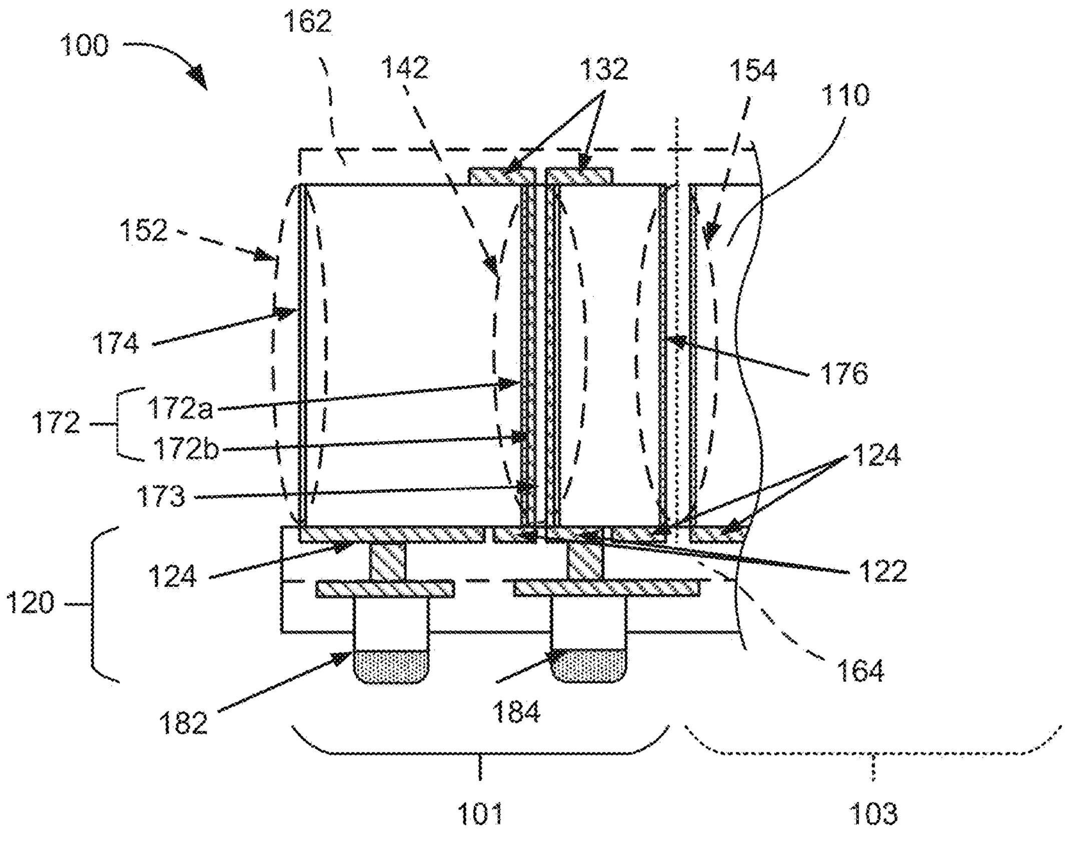
FIG. 1B is a simplified cross-sectional view of a portion of the example AOG die of FIG. 1A, according to aspects of the disclosure.

In some aspects, a second conductive layer may be disposed on the lower surface 114 as part of the metallization structure 120 and may include various conductive structures (e.g., conductive structures 122 and 124 in FIG. 1B, not shown in FIG. 1A). In some aspects, there may be a first insulating layer (e.g., insulating layer 162 in FIG. 1B, not shown in FIG. 1A) disposed on the upper surface 112 of the glass substrate 110 and covering at least a portion of the conductive structures on the upper surface 112 of the glass substrate 110. In some aspects, there may be a second insulating layer (e.g., insulating layer 164 in FIG. 1B, not shown in FIG. 1A) disposed on the lower surface 114 of the glass substrate 110 and covering at least a portion of the conductive structures on the lower surface 114 of the glass substrate 110. In some aspects, the second insulating layer 164 may be part of the metallization structure 120. In some aspects, the metallization structure 120 may include one or more additional insulating layers, conductive traces, conductive vias, conductive terminal structures, or any combination thereof. In some aspects, the first insulating layer 162 and the second insulating layer 164 may be interlayer dielectric layers (ILDs).

In some aspects, the AOG die 100 may include through-glass via (TGV) structures (e.g., TGV structures 142 and 144 of the antenna component 101) electrically coupled one or more conductive structures on the upper surface 112 to one or more conductive structures on the lower surface 114. In some aspects, each TGV structure (e.g., TGV structure 142 or TGV structure 144) may include a TGV hole and at least a first conductive film (e.g., conductive film 172 in FIG. 1B and FIG. 1C) on the sidewall of the TGV hole.

The side portion 116 may include a plurality of metalized recess structures 152. In some aspects, the plurality of metalized recess structures 152 may have recess sidewalls connecting the upper surface 112 and the lower surface 114, and each recess of the plurality of metalized recess structures 152 may have a shape corresponding to a partial TGV hole. In some aspects, a plurality of second conductive films (e.g., conductive film 174 in FIG. 1B, depicted as a shaded layer in FIG. 1A) may be respectively disposed on the recess sidewalls of the plurality of metalized recess structures 152.

In addition, the AOG die 100 may include one or more metalized TGV hole structures 154 through the glass substrate 110. In some aspects, at least a portion of the one or more metalized TGV hole structures 154 may be defined along the boundaries between the antenna components 101, 103, 105, 107, and 109. In some aspects, each one of the one or more metalized TGV hole structures 154 may correspond to a TGV hole having a second conductive film (e.g., conductive film 176 in FIG. 1B), similar to those of the metalized recess structures 152, disposed on the sidewall of the TGV hole.

FIG. 1B is a simplified cross-sectional view of a portion of the example AOG die 100 of FIG. 1A (e.g., corresponding to the antenna component 101 and a portion of the antenna component 103), according to aspects of the disclosure. In FIG. 1B, the components that are the same or similar to those in FIG. 1A are given the same reference numbers, and detailed description thereof may be omitted.

In FIG. 1B, the first insulating layer 162 is shown in dotted line representing that the first insulating layer 162 is not depicted in FIG. 1A. Also, as a simplified cross-sectional view, various conductive traces, vias, and/or conductive terminal structures embedded in or disposed on the metallization structure 120 may be simplified in FIG. 1B. In some aspects, the first insulating layer 162 or the second insulating layer 164 may include silicon dioxide, an organic polymeric dielectric, polyimide, polynorbornene, benzocyclobutene, polytetrafluoroethylene, a silicone based polymeric dielectric, or any combination thereof.

As shown in FIG. 1B, the metallization structure 120 may further include conductive terminal structures 182 and 184. In some aspects, the conductive terminal structure 182 may be electrically coupled to the conductive structure 124 through an opening of the second insulating layer 164. In some aspects, the conductive terminal structure 184 may be electrically coupled to the conductive structure 122 through another opening of the second insulating layer 164. In some aspects, as non-limiting examples, each of the conductive terminal structures 182 and 184 may correspond to a solder bump, a copper pillar bump, or a micro ball bump.

As shown in FIG. 1B, the second conductive layer may include a conductive structure 122 that is electrically coupled to the conductive structure 132 through the TGV structure 142. The second conductive layer may further include a conductive structure 124 that is a ground conductive structure electrically coupled to a ground reference level and may be configured as a ground panel of the antenna element formed by the conductive structure 132.

Figure 1C:
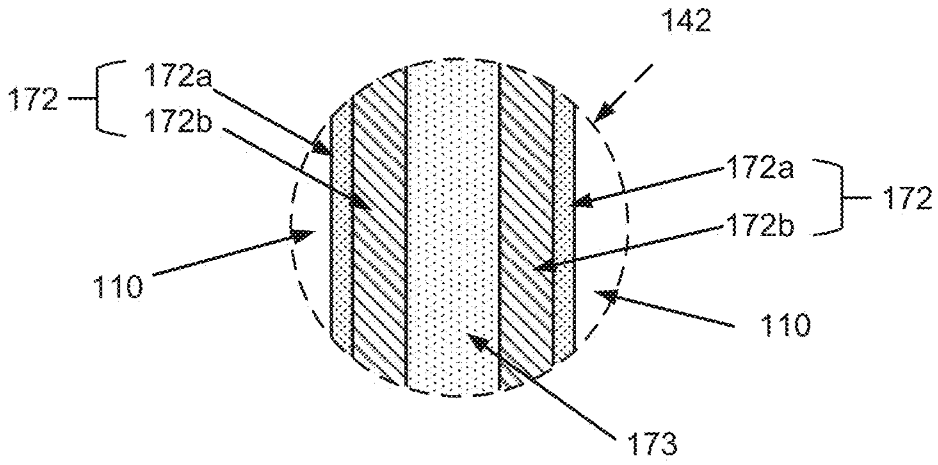
FIG. 1C shows an enlarged view of a through glass via (TGV) structure, according to aspects of the disclosure.

FIG. 1C shows an enlarged view of a through glass via (TGV) structure 142, according to aspects of the disclosure. As shown in FIGS. 1B and 1C, in some aspects, the first conductive film 172 of each TGV structure 142 may include a first part 172*a* and a second part 172*b*, where the first part 172*a* is between the sidewall of the TGV hole and the second part 172*b*. In some aspects, a dry film dielectric 173 may fill a space within the TGV structure 142 surrounded by the first conductive film 172.

Figure 1D:
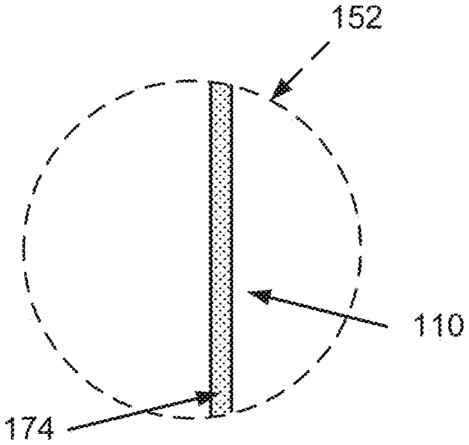
FIG. 1D shows an enlarged view of a metalized recess structure, according to aspects of the disclosure.
Figure 1E:
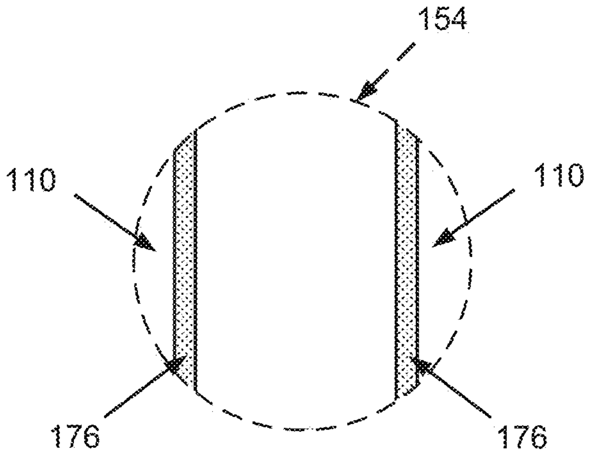
FIG. 1E shows an enlarged view of a metalized TGV hole structure, according to aspects of the disclosure.

FIG. 1D shows an enlarged view of a metalized recess structure 152, according to aspects of the disclosure. As shown in FIGS. 1B and 1D, in some aspects, the metalized recess structures 152 may include second conductive films 174 disposed on the respective recess sidewalls of the metalized recess structures 152. FIG. 1E shows an enlarged view of a metalized TGV hole structure 154, according to aspects of the disclosure. As shown in FIGS. 1B and 1E, in some aspects, the metalized TGV hole structures 154 may include second conductive films 176 disposed on the respective TGV hole sidewalls of the metalized TGV hole structures 154. In some aspects, the second conductive films 174 and 176 may be electrically coupled to a grounding conductive structure, such as the conductive structure 124.

In some aspects, the first part 172*a* of the first conductive film 172 and the second conductive film 174 and 176 of each metalized recess structures 152 or metalized TGV hole structure 154 may correspond to a seed conductive film and may be made of a first material, such as titanium, copper, or a combination thereof. In some aspects, the second part 172*b* of the first conductive film 172 may correspond to an additional conductive film (e.g., by deposition or plating) on the seed layer, and may be made a second material such as copper. Accordingly, in some aspects, a thickness of the first conductive film 172 may be greater than a thickness of the second conductive films 174 and 176. In some aspects, each of the conductive structures on the upper surface 112 and the conductive structures on the lower surface 114 may also include a first part made of the first material and corresponding to the seed layer, and a second part made of the second material and corresponding to the additional conductive film.

In some aspects, the second conductive films 174 on the recess sidewalls of the plurality of metalized recess structures 152 may be electrically coupled to the ground reference level, such that the second conductive films 174 on the recess sidewalls of the plurality of metalized recess structures 152 may be configured as a shielding structure for shielding the antenna elements of the AOG die 100 from other components outside the AOG die. In some aspects, the second conductive films 176 on the sidewalls of the metalized TGV hole structure 154 may be electrically coupled to the ground reference level, such that the second conductive films 174 on the sidewalls of the metalized TGV hole structure 154 may be configured as a shielding structure for shielding individual antenna elements of the AOG die 100 from one another.

In some non-limiting examples, the conductive structure 132 may be configured as a patch antenna operating in a mmWave frequency range. In these examples, the thickness of the glass substrate 110 may range from 0.7 millimeters (mm) to 1.0 mm. In these examples, the diameter of the TGV holes used for forming the metalized recess structures 152 may range from 80 micrometers (μm) to 150 μm. In these examples, the pitch between two adjacent metalized recess structures may range from 80 μm to 150 μm. In some aspects, the pitch between two adjacent metalized recess structures may be set to be about the same (e.g., within 5% tolerance) as the diameter of the TGV holes used for forming the metalized recess structures.

In some aspect, the EMI shielding provided by the metalized recess structure and/or the metalized TGV hole structures may improve the antenna performance (e.g., antenna gain, throughput, and/or bandwidth). In some aspects, the EMI shielding may effectively confine electromagnetic energy within the antenna components and/or reduce electromagnetic interference from adjacent components outside the antenna components.

Accordingly, any degradation on the directivity and gain of each antenna component caused by EMI may be reduced, and hence the antenna throughput and/or bandwidth may be improved. In some examples, the shielding structure as discussed in FIGS. 1A-1E may improve the antenna gain by at least 1 dB, increase the throughput by at least 5%, and/or increase the bandwidth by 10%, as compared with a similar AOG die configuration without the metalized recess structures 152 on the side portion thereof.

Figure 2A:
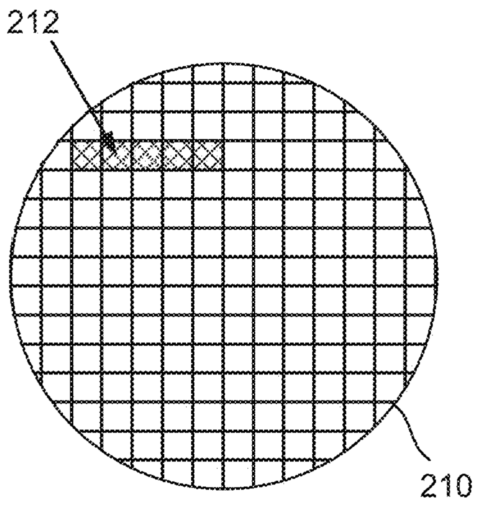
FIG. 2A shows a top view of a glass substrate wafer, according to aspects of the disclosure.

FIG. 2A shows a top view of a glass substrate wafer 210, according to aspects of the disclosure. In some aspects, the glass substrate 110 of the AOG die 100 may be based on a glass base substrate in the form of the glass substrate wafer 210. In some aspects, the glass substrate wafer 210 may be used to form a plurality of antenna components, where the five antenna components 212 may correspond to the AOG die 100.

Figure 2B:
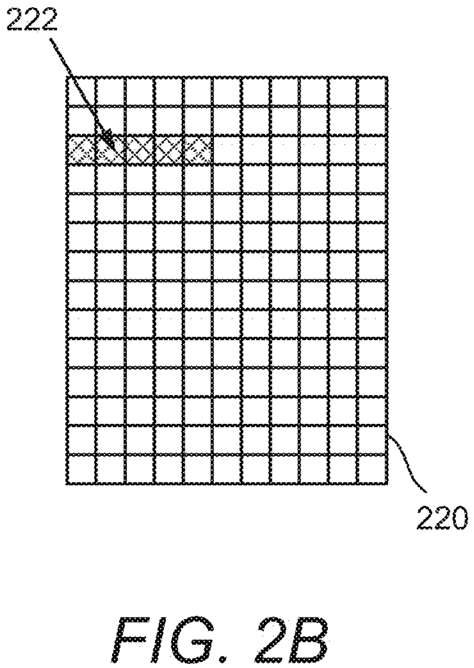
FIG. 2B shows a top view of a glass substrate panel, according to aspects of the disclosure.

FIG. 2B shows a top view of a glass substrate panel 220, according to aspects of the disclosure. In some aspects, the glass substrate 110 of the AOG die 100 may be based on a glass base substrate in the form of the glass substrate panel 220. In some aspects, the glass substrate panel 220 may be used to form a plurality of antenna components, where the five antenna components 222 may correspond to the AOG die 100.

Figure 3A:
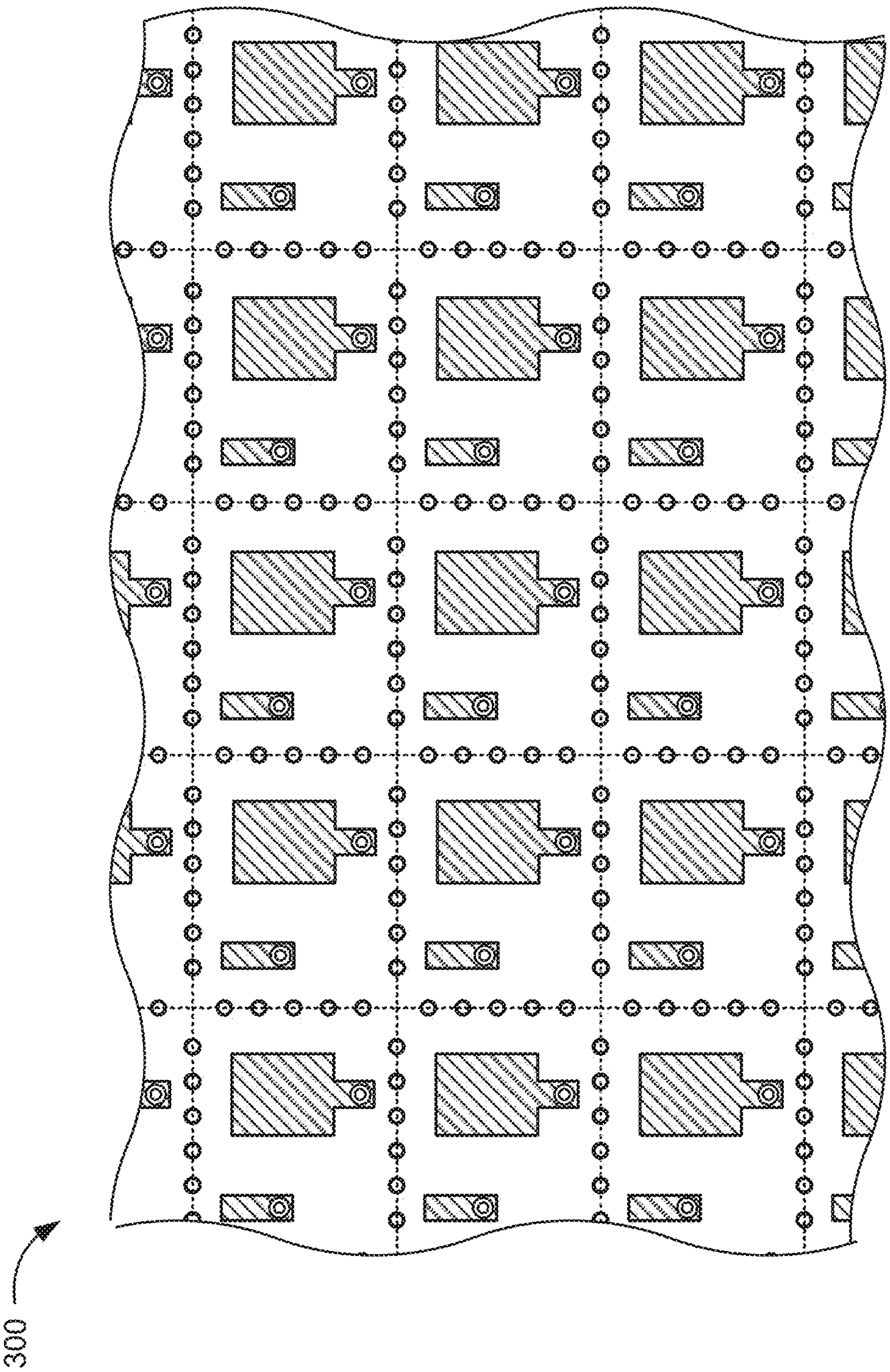
FIG. 3A is a top view of a portion of a glass base substrate, according to aspects of the disclosure.

FIG. 3A is a top view of a portion 300 of a glass base substrate (e.g., the glass substrate wafer 210 in FIG. 2A or the glass substrate panel 220 in FIG. 2B), according to aspects of the disclosure. Each antenna component (not labeled) in the portion 300 defined by dotted boundary lines may correspond to an antenna component formed in the glass base substrate. In some aspects, an AOG die (e.g., the AOG die 100) may be formed by performing a singulation process to separate the AOG die (e.g., including five contiguous antenna components) from the glass base substrate.

Figure 3B:
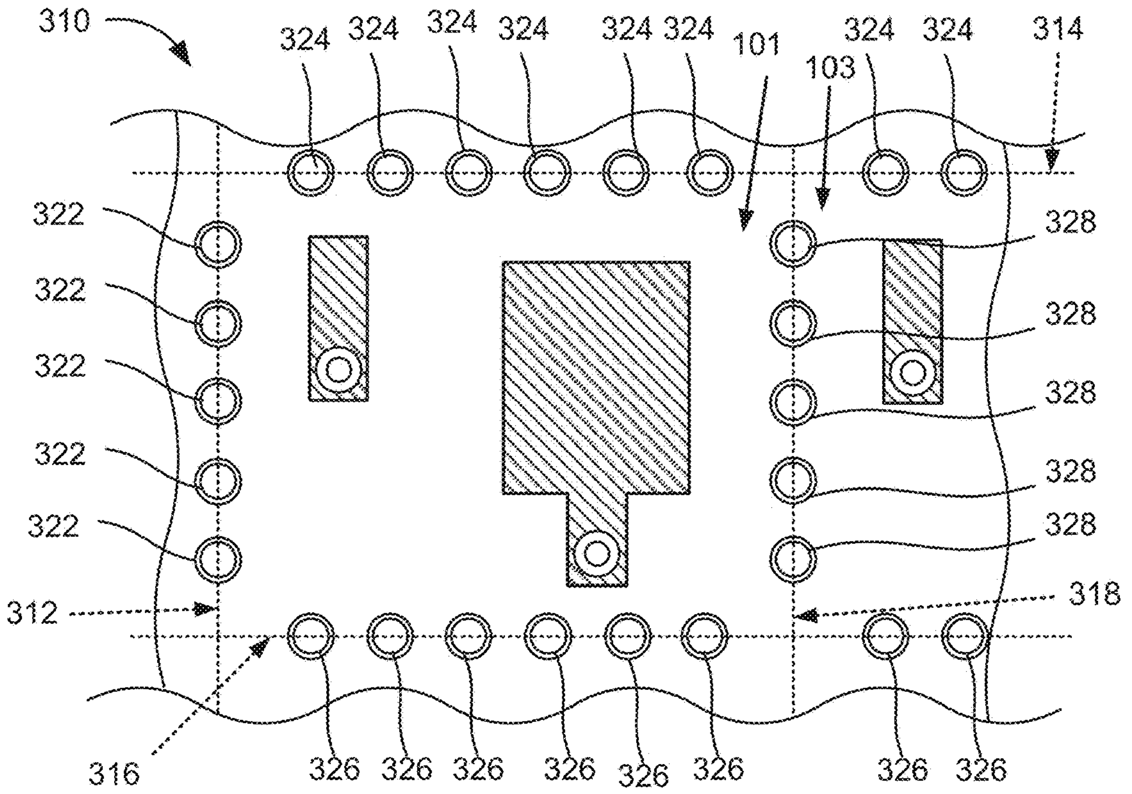
FIG. 3B is an enlarged top view of a portion of the glass base substrate of FIG. 3A, according to aspects of the disclosure.

FIG. 3B is an enlarged top view of a portion 310 of the glass base substrate, which is part of the portion 300 in FIG. 3A, according to aspects of the disclosure. In some aspects, the portion 310 showing an AOG die (e.g., the AOG die 100) that is still a part of the glass base substrate, with the dotted lines 312, 314, and 316 defining three boundaries of the AOG die and the dotted line 318 defining a boundary between two antenna components (e.g., the antenna components 101 and 103) of the AOG die. A plurality of metalized TGV hole structures 322 may be formed along the boundary line 312; a plurality of metalized TGV hole structures 324 may be formed along the boundary line 314; a plurality of metalized TGV hole structures 326 may be formed along the boundary line 316; and a plurality of metalized TGV hole structures 328 may be formed along the boundary line 318.

Figure 3C:
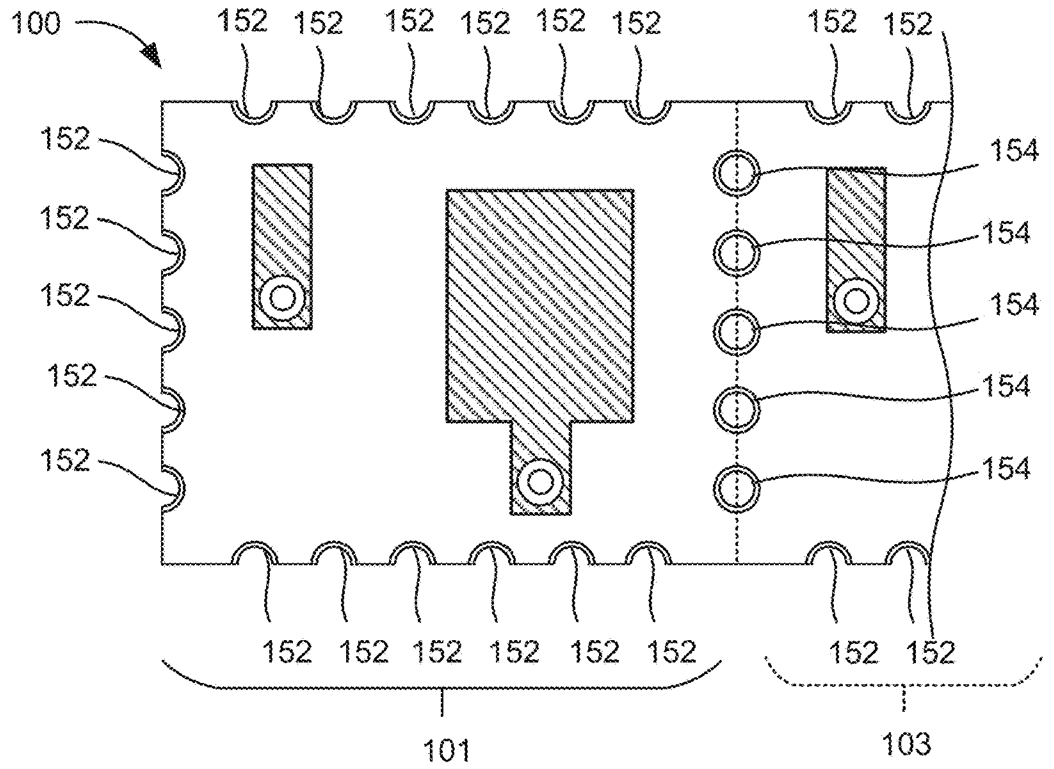
FIG. 3C is an enlarged top view of a portion of an AOG die separated from the glass base substrate, according to aspects of the disclosure.

FIG. 3C is an enlarged top view of a portion of an AOG die (e.g., the AOG die 100) separated from the glass base substrate, such as the glass substrate wafer or the glass substrate panel shown in FIGS. 3A and 3B, according to aspects of the disclosure. In some aspects, to form the AOG die 100, a singulation process may be performed on the glass base substrate shown in FIG. 3B to cut along the boundary lines 312, 314, and 316 depicted in FIG. 3B. In some aspects, by performing the singulation process cutting through the metalized TGV hole structures 322, 324, and 326 to separate the AOG die 100 from the glass base substrate, a remaining portion (staying with the AOG dic) of the metalized TGV hole structures 322, 324, and 326 becoming the metalized recess structures 152 of the side portion of the glass substrate of the AOG die 100. In some aspects, the metalized TGV hole structures 328 remain intact and become the metalized TGV hole structures 154.

As shown in FIGS. 3A-3C, the plurality of metalized recess structures 152 of the AOG die 100 with the conductive films 174 disposed thereon may originally have the form similar to the metalized TGV hole structure 154 with conductive films 176 on the sidewalls when the AOG die 100 is still part of the glass base substrate. The metalized TGV hole structure on the edge (e.g., side portion) of the AOG die 100 (with the conductive film on the sidewalls) may become the metalized recess structures 152 (with the conductive film on the recess sidewalls) after the singulation process to separate the AOG die 100 from the rest of the glass base substrate.

Figure 4:
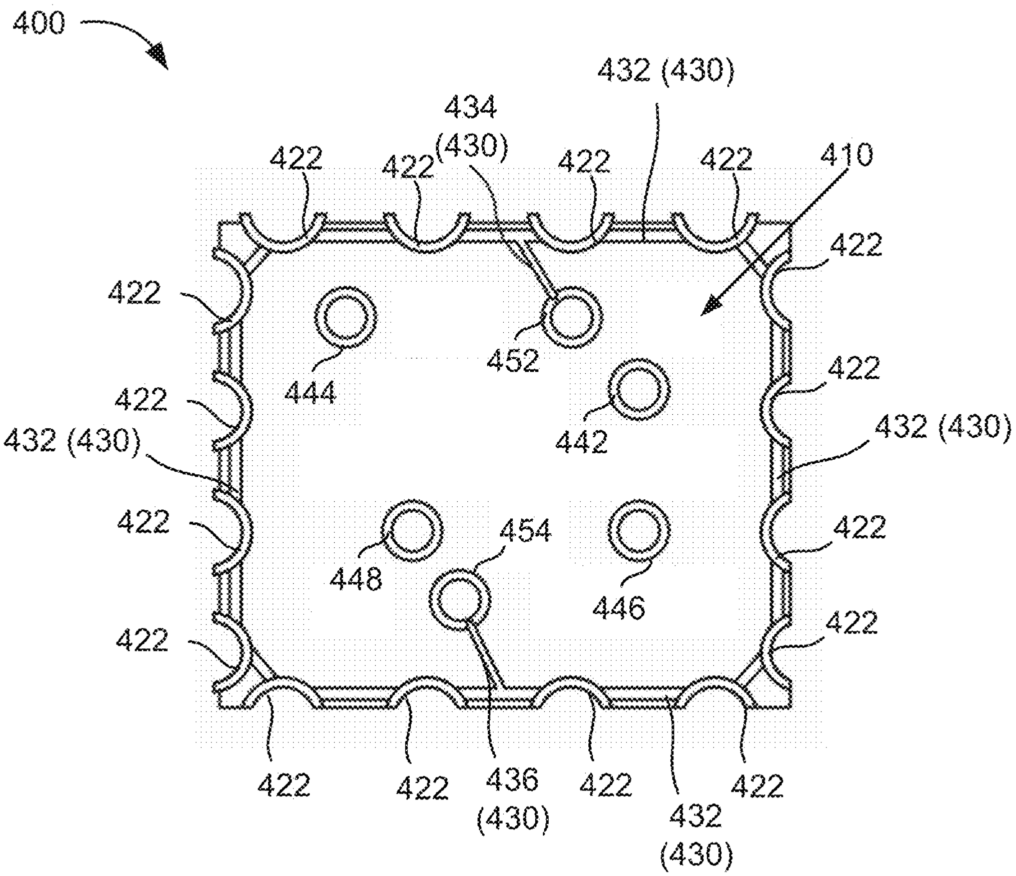
FIG. 4 is a simplified top view of an AOG die showing another example configuration of connecting the conductive films on the recess sidewalls to a ground reference level, according to aspects of the disclosure.

In some aspects, the grounding conductive structure may be formed based on a second conductive layer on a lower surface of the glass substrate (e.g., the example shown in FIG. 1B), or based on a first conductive layer on an upper surface lower surface of the glass substrate, or any combination thereof. FIG. 4 is a simplified top view of an AOG die 400 showing another example configuration of connecting the conductive films 422 on the recess sidewalls of the side portion of the AOG die 400 to a ground reference level, based on having a grounding conductive structure 430 on the upper surface of the glass substrate 410 of the AOG die 400, according to aspects of the disclosure.

As shown in FIG. 4, the AOG die 400 may correspond to an example where the AOG die only includes a single antenna element. In FIG. 4, various conductive structures on the upper surface of the glass substrate 410 are not depicted for clarity, except the grounding conductive structure 430. In some aspects, the AOG die 400 may be implemented based on the AOG structure illustrated by the example AOG die 100, and detailed description of various components may be simplified or omitted.

As shown in FIG. 4, the AOG die 400 may include a side portion on which a plurality of metalized recess structures is formed. The metalized recess structures include respective conductive films 422 on the recess sidewalls. The AOG die 400 further includes TGV structures 442, 444, 446, 448, 452, and 454 as a non-limiting example. In some aspects, the TGV structures 442, 444, 446, 448, 452, and 454 may be electrically coupled to one or more conductive structures on the upper surface (not shown) of the glass substrate 410 and may be configured to carry power sources or signals. In some aspects, the TGV structures 452 and 454 may be configured to carry a ground reference level through one or more conductive terminals formed under the glass substrate.

In this example, the grounding conductive structure 430 formed on the upper surface of the glass substrate 410 may include a conductive ring structure 432 electrically coupling the conductive films 422 of the metalized recess structures together. The grounding conductive structure 430 may further include a conductive structure 434 connecting the conductive ring structure 432 to the TGV structure 452; and a conductive structure 436 connecting the conductive ring structure 432 to the TGV structure 454.

In some aspects, as another example and similar to that illustrated in FIGS. 1A-1E, a grounding conductive structure may be formed under the glass substrate as a ground reference panel electrically connecting all the conductive films 422 of the metalized recess structures. In some aspects, as yet another example, a grounding conductive structure may be formed under the glass substrate taking the form similar to the grounding conductive structure 430 electrically connecting all the conductive films 422 of the metalized recess structures based on a conductive ring structure.

Figure 5A:
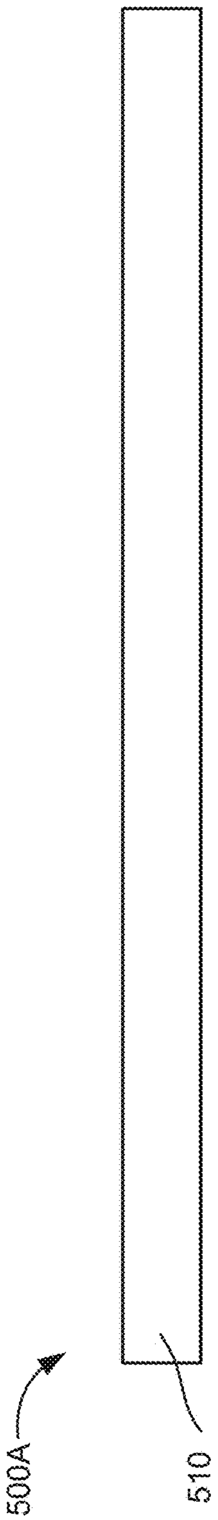
FIGS. 5A-5N illustrate simplified cross-sectional views of structures at various stages of fabricating one or more AOG dies, according to aspects of the disclosure.
Figure 5B:
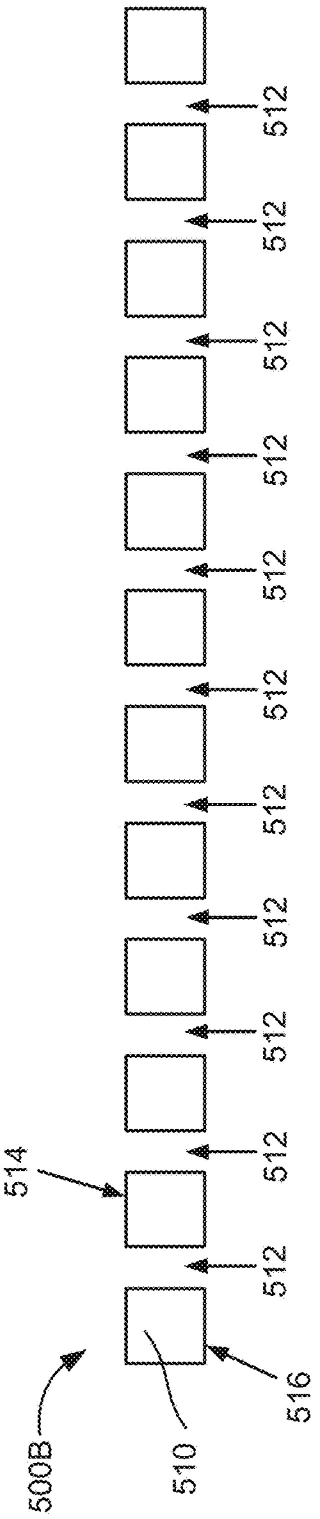
Figure 5C:
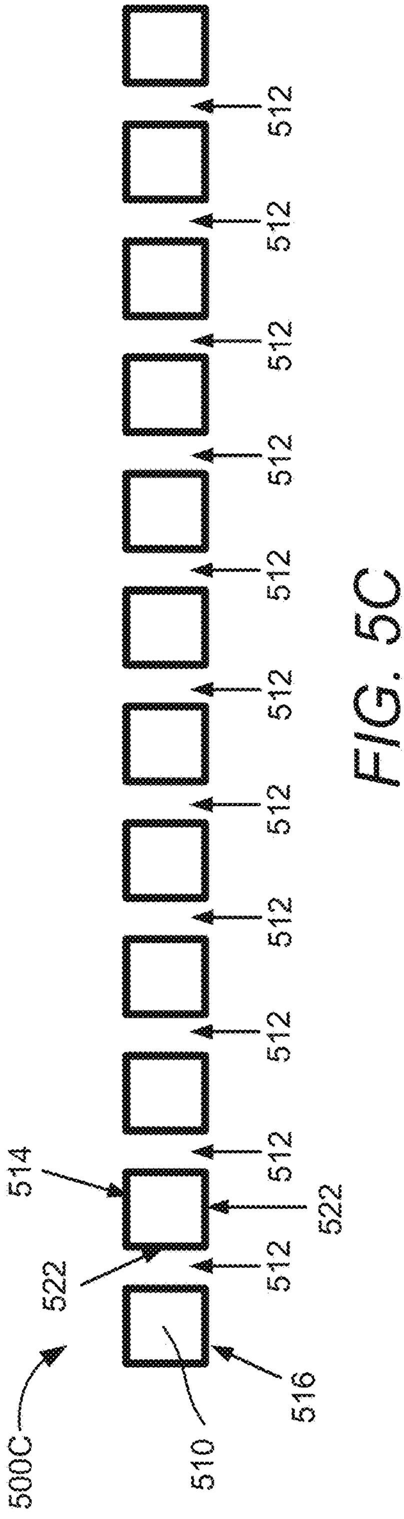
Figure 5D:
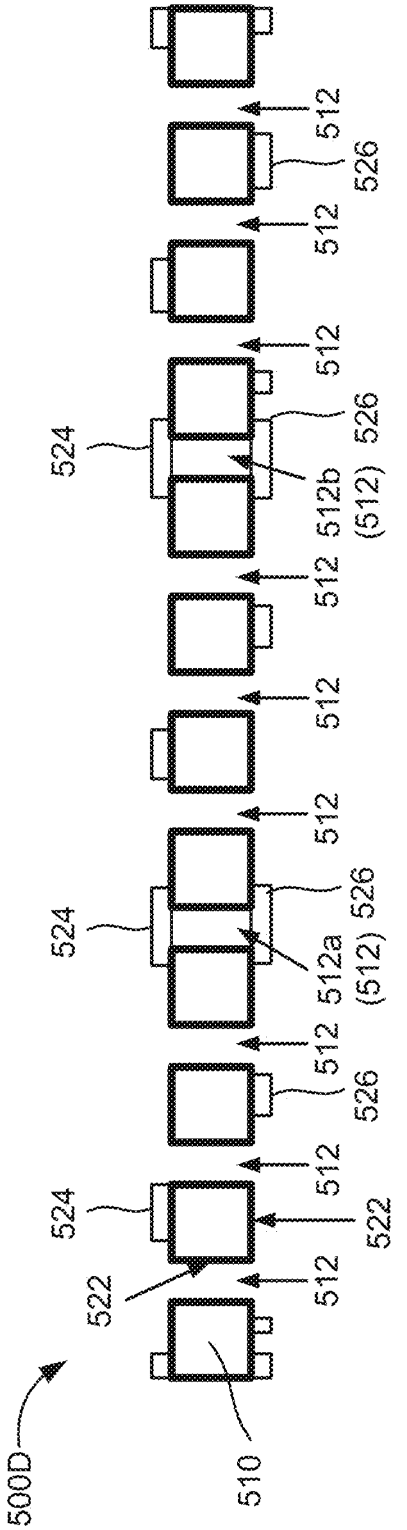
Figure 5E:
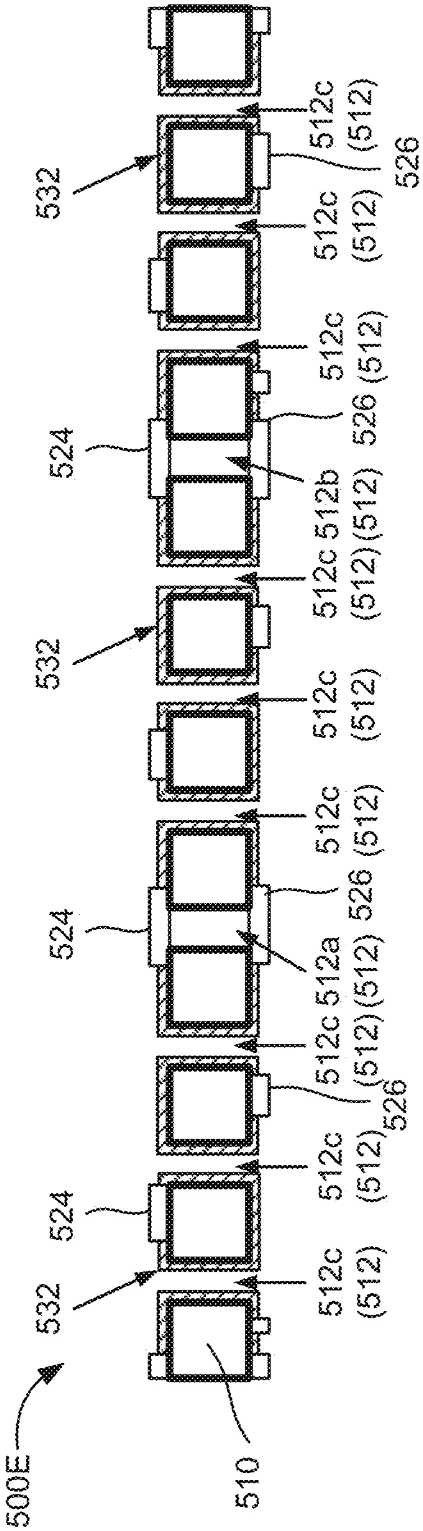
Figure 5F:
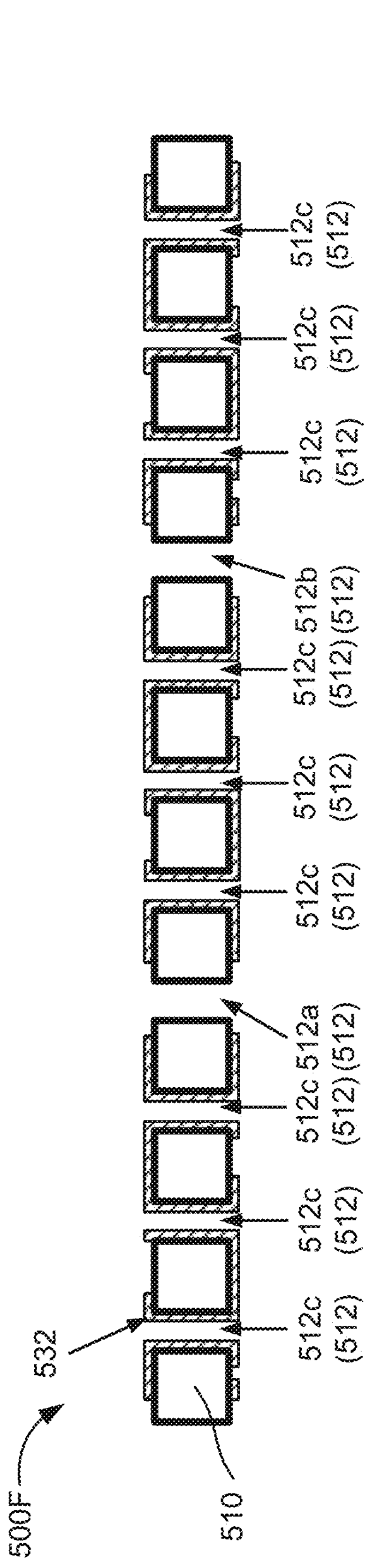
Figure 5G:
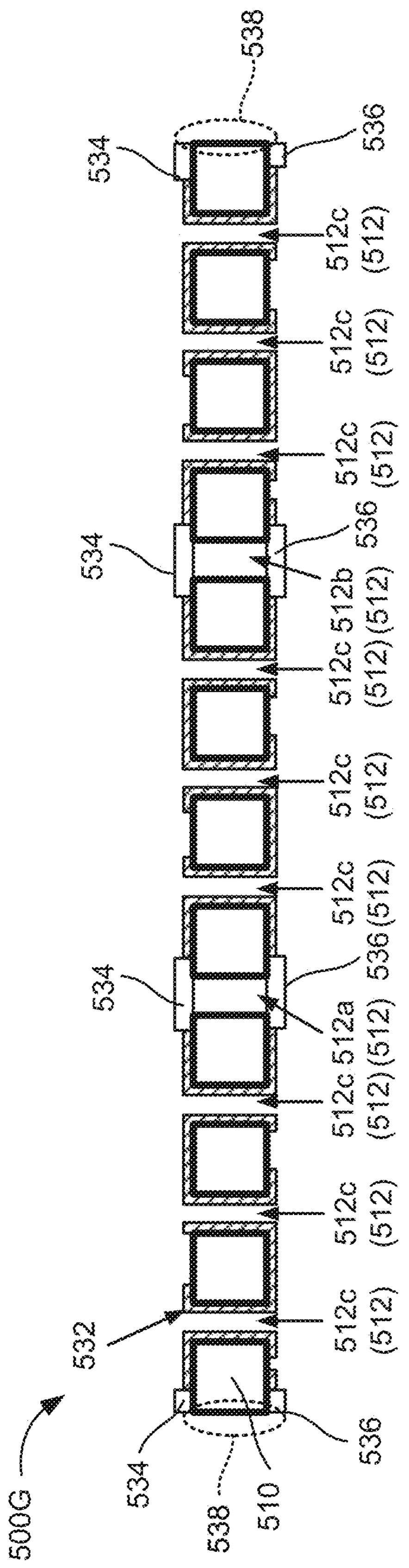
Figure 5H:
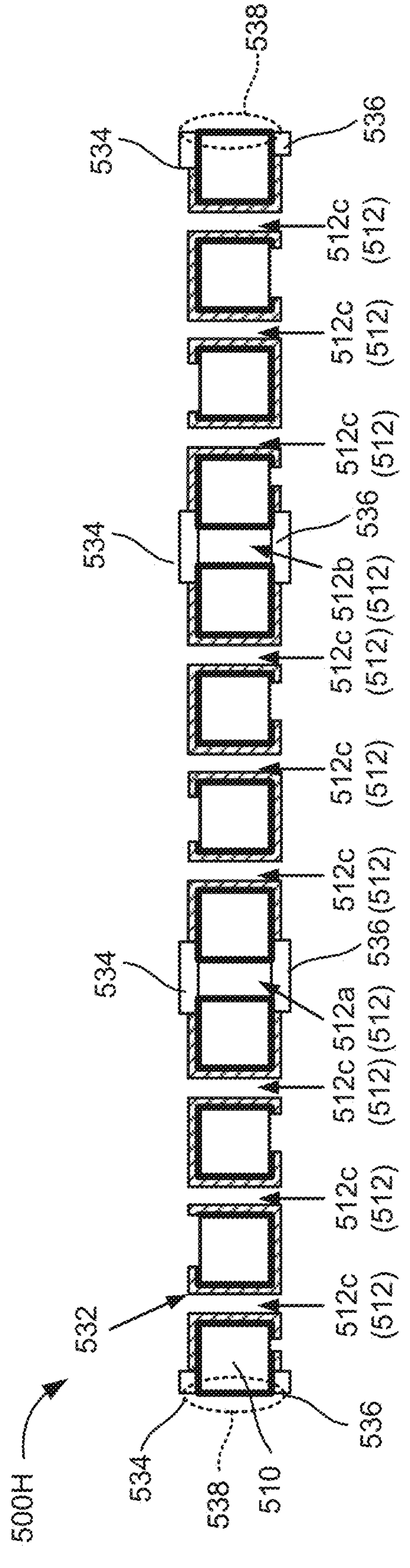
Figure 5I:
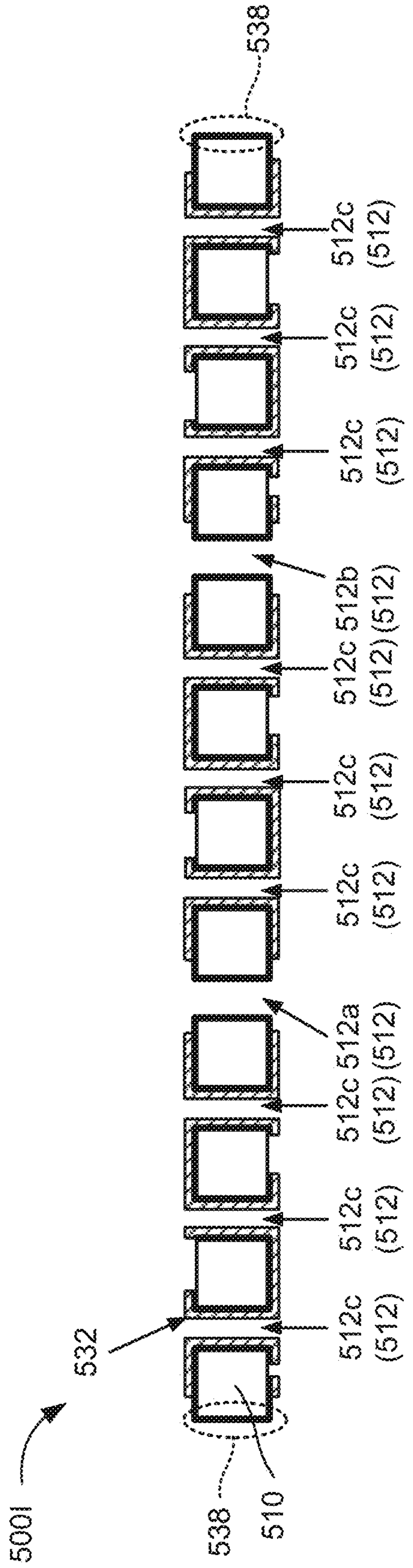
Figure 5J:
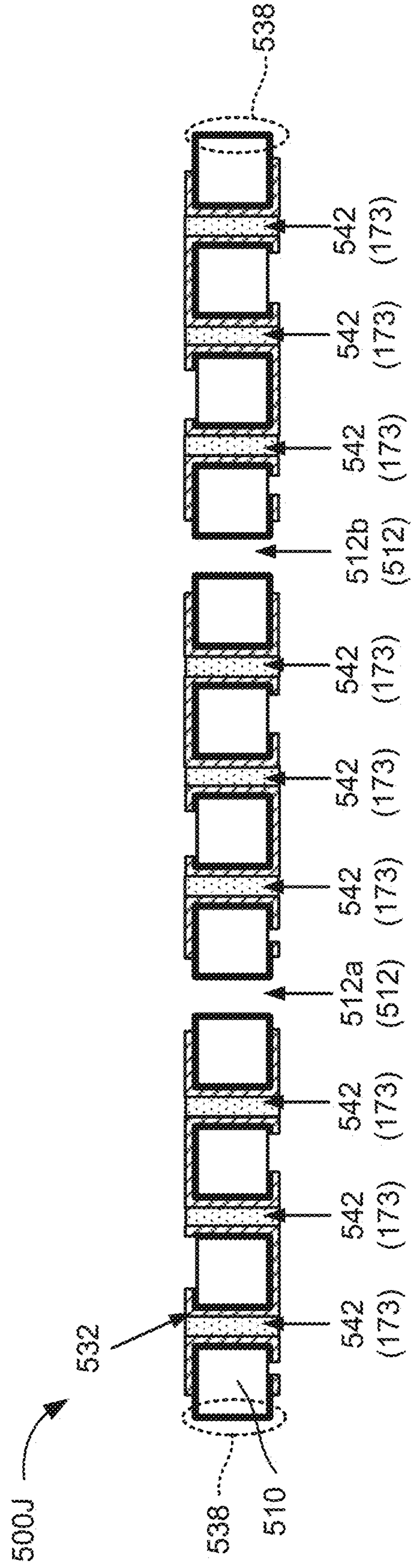
Figure 5K:
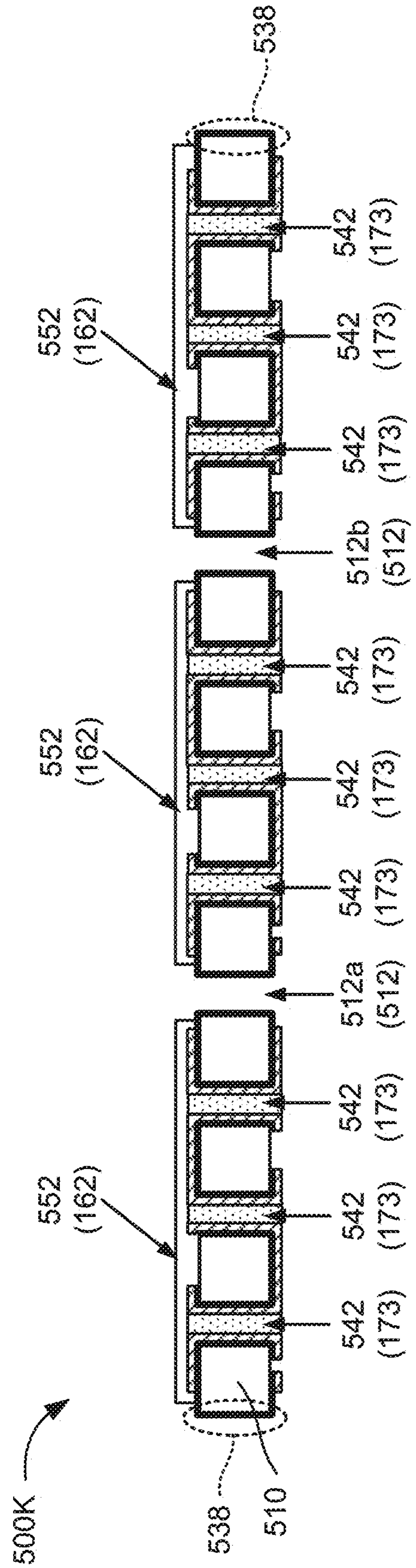
Figure 5L:
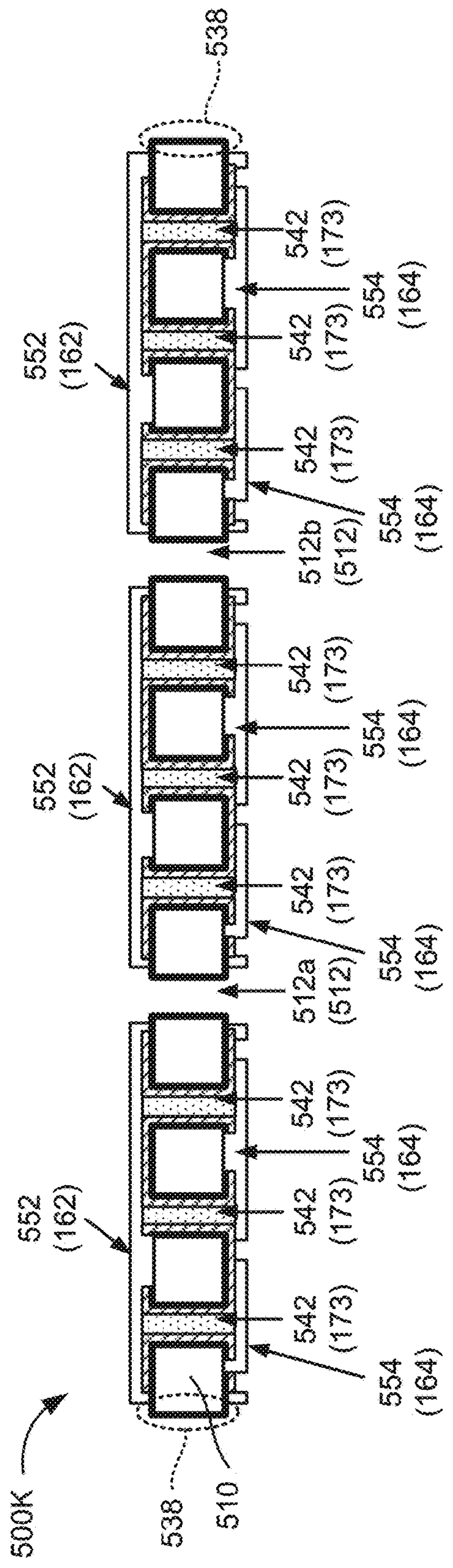
Figure 5M:
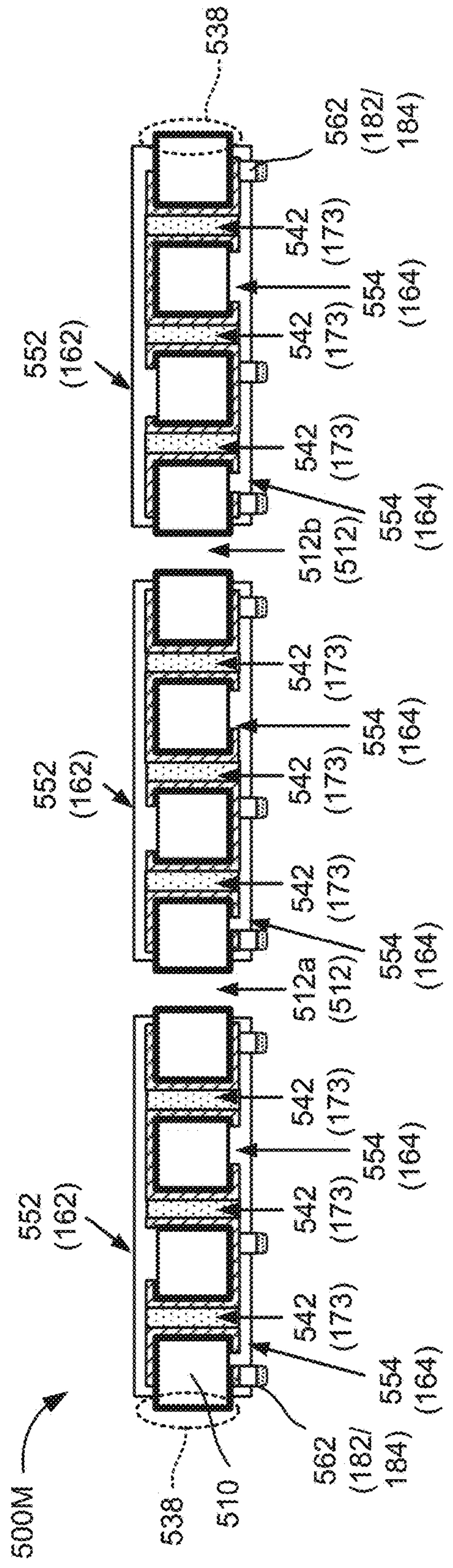
Figure 5N:
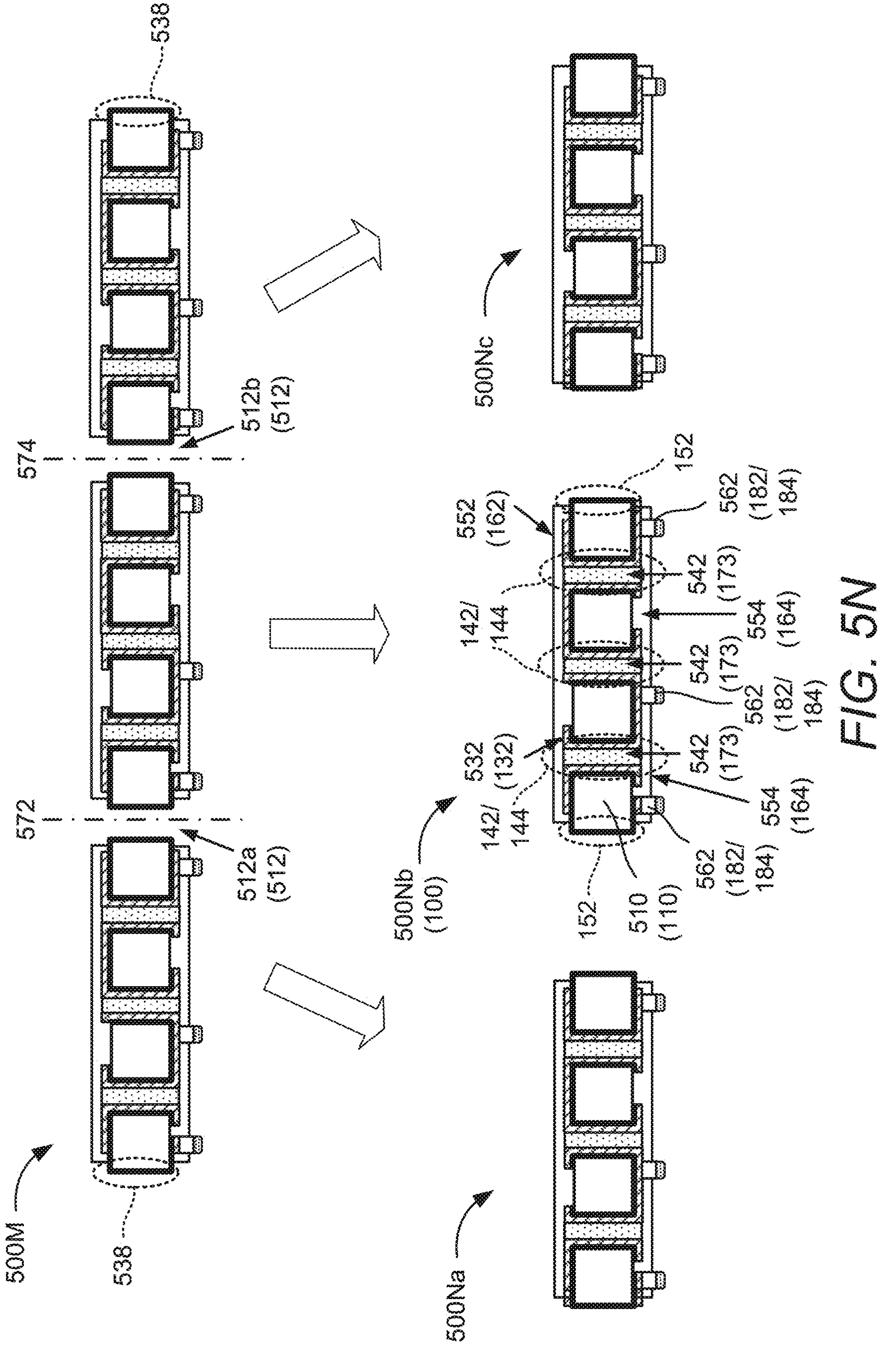

FIGS. 5A-5N illustrate simplified cross-sectional views of structures at various stages of fabricating one or more AOG dies (e.g., having a structure based on the AOG die 100), according to aspects of the disclosure. The components illustrated in FIGS. 5A-5N that are the same or similar to those of FIGS. 1A-1E are given the same reference numbers, and the detailed description thereof may be omitted.

As shown in FIG. 5A, a structure 500A, which may correspond to a glass base substrate 510, may be provided. In some aspects, the glass base substrate 510 may correspond to the glass substrate wafer 210 or the glass substrate panel 220 illustrated in FIGS. 2A-2B.

As shown in FIG. 5B, a structure 500B may be formed based on forming a plurality of TGV holes 512 within the glass base substrate 510. In some aspects, the TGV holes 512 may take the form of empty columns or cylinders between an upper surface 514 and a lower surface 516 of the glass base substrate 510. In some aspects, the TGV holes 512 may be formed based on mechanical drilling or laser drilling.

As shown in FIG. 5C, a structure 500C may be formed based on the structure 500B by forming a seed conductive film 522 (depicted as thick line segments) on the upper surface 514 and the lower surface 516 of the glass base substrate 510 and on a sidewall of each of the plurality of TGV holes 512. In some aspects, the seed conductive film 522 may be made of a first conductive material that may include titanium, copper, or a combination thereof. In some aspects, the seed conductive film 522 may be formed based on a physical vapor disposition (PVD) process.

As shown in FIG. 5D, a structure 500D may be formed based on the structure 500C by forming photo resist patterns 524 on the upper surface 514 of the glass base substrate 510, and forming photo resist patterns 526 on the lower surface 516 of the glass base substrate 510. In some aspects, the photo resist patterns 524 and the photo resist patterns 526 may cover a portion of the seed conductive film 522 where an additional conductive film will not be formed. In some aspects, the photo resist patterns 524 and the photo resist patterns 526 may cover the TGV holes (e.g., TGV holes 512*a* and 512*b*) corresponding to the boundaries of AOG dies, and/or the edges of the glass base substrate 510 corresponding to the boundaries of AOG dies. Accordingly, a first seed pattern may be defined based on a first portion of the seed conductive film 522 on the upper surface of the glass base substrate 510 (e.g., not covered or exposed by the seed conductive film 522). Also, a second seed pattern may be defined based on a second portion of the seed conductive film 522 on the lower surface of the glass base substrate 510 (e.g., not covered or exposed by the seed conductive film 522).

As shown in FIG. 5E, a structure 500E may be formed based on the structure 500D by forming an additional conductive film 532 on the first seed pattern, on the second seed pattern, and on a third portion of the seed conductive film on the sidewall of the TGV holes 512*c*. In some aspects, the additional conductive film 532 may be formed by deposition or plating. In some aspects, the additional conductive film 532 may be made of a second material that includes copper. In some aspects, the TGV holes 512*c* together with the corresponding seed conductive film 522 and the additional conductive film 532 formed on the sidewalls thereof may correspond to the TGV structures 142 in FIG. 1B.

In some aspects, the first seed pattern and a first portion of the additional conductive film 532 on the first seed pattern may correspond to the conductive structure 132 in FIG. 1B. In some aspects, the conductive structure 132 may be configured as a patch antenna.

In some aspects, the second seed pattern and a second portion of the additional conductive film 532 on the second seed pattern may correspond to the conductive structures 122 and 124 in FIG. 1B. In some aspects, the third portion of the seed conductive film on the sidewalls of the TGV holes 512*c* may correspond to the first part 172*a* of the first conductive film 172 in FIG. 1B, and a third portion of the additional conductive film on the third portion of the seed conductive film on the sidewall of the TGV holes 512*c* may correspond to the second part 172*b* of the first conductive film 172 in FIG. 1B. Moreover, a fourth portion of the seed conductive film on the sidewall of each of the TGV holes 512*a* and 512*b* may correspond to the second conductive films 714 on the recess sidewalls of the plurality of recesses metalized recess structures 152 in FIG. 1B.

As shown in FIG. 5F, a structure 500F may be formed based on the structure 500E by removing the photo resist patterns 524 and 526.

As shown in FIG. 5G, a structure 500G may be formed based on the structure 500F by forming photo resist patterns 534 on the upper surface 514 of the glass base substrate 510, and forming photo resist patterns 536 on the lower surface 516 of the glass base substrate 510. In some aspects, the photo resist patterns 534 and the photo resist patterns 536 may cover the TGV holes (e.g., TGV holes 512*a* and 512*b*) corresponding to the boundaries of AOG dies, and/or the edges (e.g., edges 538) of the glass base substrate 510 corresponding to the boundaries of AOG dies. In some aspects, the portion of the seed conductive film 522 where the additional conductive film is not formed will be exposed at this stage.

As shown in FIG. 5H, a structure 500H may be formed based on the structure 500G by removing the exposed parts of the seed conductive film 522, using the photo resist patterns 534 and the photo resist patterns 536 as masks. While the additional conductive film 532 may be partially removed when removing the exposed parts of the seed conductive film 522, as the additional conductive film 532 is much thicker than the seed conductive film 522, the desired conductive structures based on the additional conductive film 532 may only be slightly removed without affecting the functionality of the desired conductive structures. That is, the additional conductive film 532 based on its thickness may also function as a mask withstanding the removal of the exposed parts of the seed conductive film 522.

As shown in FIG. 5I, a structure 500I may be formed based on the structure 500H by removing the photo resist patterns 534 and 536.

As shown in FIG. 5J, a structure 500J may be formed based on the structure 500I by filling the remaining portion of the TGV holes 512*c*, which may correspond to the space within the TGV structures formed based on the TGV holes 512*c* and surrounded by the first conductive films on the sidewalls of the TGV structures, with a dry film dielectric 542. In some aspects, the dry film dielectric 542 may correspond to the dry film dielectric 173 in FIG. 1B.

As shown in FIG. 5K, a structure 500K may be formed based on the structure 500J by forming a first insulating layer 552 on the upper surface of the glass base substrate 510 and covering at least a portion of the first conductive structure on the upper surface. In some aspects, the first insulating layer 552 may correspond to the first insulating layer 162 in FIG. 1B.

As shown in FIG. 5L, a structure 500L may be formed based on the structure 500K by forming a second insulating layer 554 on the lower surface of the glass base substrate 510 and covering at least a portion of the second conductive structure on the lower surface. In some aspects, the second insulating layer 554 may correspond to the second insulating layer 164 in FIG. 1B.

In some aspects, the first insulating layer 552(162) or the second insulating layer 554(164) may include silicon dioxide, an organic polymeric dielectric, polyimide, polynorbornene, benzocyclobutene, polytetrafluoroethylene, a silicone based polymeric dielectric, or any combination thereof.

As shown in FIG. 5M, a structure 500M may be formed based on the structure 500L by forming conductive terminal structures 562 and/or other conductive traces or conductive vias in order to electrically couple the conductive structures on the lower surface of the glass base substrate 510 through respective opening of the second insulating layer 554. In some aspects, each of the conductive terminal structures may correspond to a solder bump, a copper pillar bump, or a micro ball bump. In some aspects, the conductive terminal structures 562 may correspond to the conductive terminal structures 182 or 184 in FIG. 1B.

As shown in FIG. 5N, a plurality of AOG dies 500Na, 500Nb, 500Nc may be formed based on the structure 500M by performing a singulation process on the structure 500M. Each one of the AOG dies 500Na, 500Nb, 500Nc may correspond to the AOG die 100 and may include corresponding components as illustrated in FIG. 1A-1E. In some aspects, the singulation process may be performed cutting along the boundaries of various AOG dies depicted as dotted lines 572 and 574 based on laser ablation dicing, saw blade dicing, or scribing and breaking. As illustrated in FIG. 5N and FIG. 3B-3C, after singulation, a portion of the seed conductive film 522 remains on the sidewalls of the split TGV holes 512*a* and 512*b* and the edges 538. These remaining portions of the seed conductive film 522 may form the metalized recess structures (e.g., the metalized recess structures 152) configured to provide EMI shielding.

Figure 6:
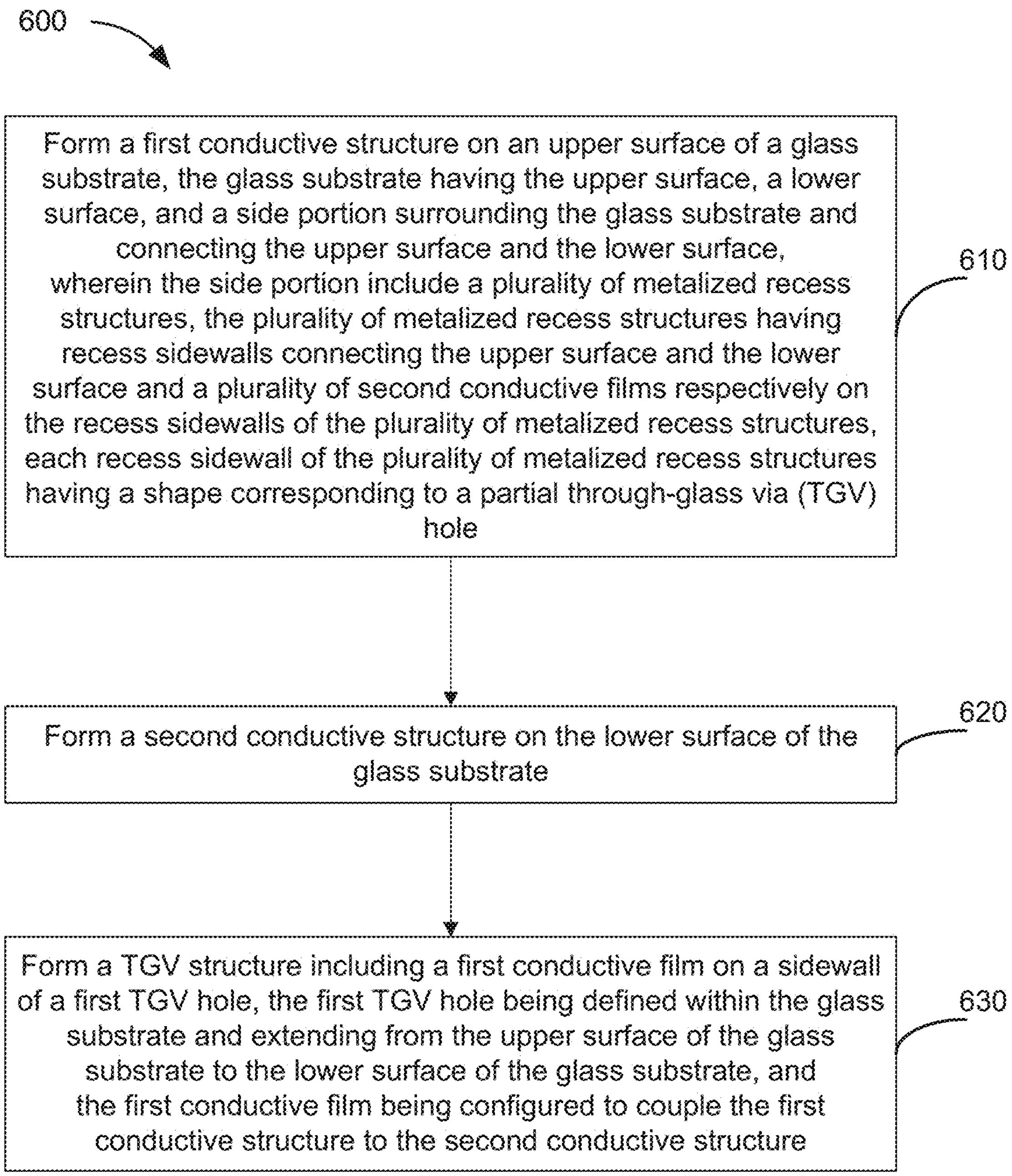
FIG. 6 illustrates a method for fabricating an antenna apparatus, according to aspects of the disclosure.

FIG. 6 illustrates a method 600 for fabricating an antenna apparatus (such as the AOG die 100 in FIGS. 1A-1B, the AOG die 400 in FIG. 4, and/or the AOG dies 500Na, 500Nb, and 500Nc in FIG. 5N), according to aspects of the disclosure. In some aspects, FIGS. 5A-5N may depict the structures at various stages of fabricating an antenna apparatus (e.g., an AOG die) according to the method 600.

At operation 610, a first conductive structure (e.g., the conductive structure 132) may be formed on an upper surface of a glass substrate (e.g., the glass substrate 110). In some aspects, the glass substrate having the upper surface (e.g., the upper surface 112), a lower surface (e.g., the lower surface 114), and a side portion (e.g., the side portion 116) surrounding the glass substrate and connecting the upper surface and the lower surface. In some aspects, the side portion may include a plurality of metalized recess structures (e.g., the metalized recess structures 152). In some aspects, the plurality of metalized recess structures having recess sidewalls connecting the upper surface and the lower surface and a plurality of second conductive films respectively on the recess sidewalls of the plurality of metalized recess structures. In some aspects, each recess sidewall of the plurality of metalized recess structures having a shape corresponding to a partial TGV hole.

At operation 620, a second conductive structure (e.g., the conductive structure 122) may be formed on the lower surface of the glass substrate. In some aspects, a grounding conductive structure (e.g., the conductive structure 124 and/or the grounding conductive structure 430) on the upper surface of the glass substrate, the lower surface of the glass substrate, or any combination thereof. In some aspects, wherein the plurality of second conductive films is electrically coupled to the grounding conductive structure.

At operation 630, a TGV structure (e.g., the TGV structure 142) may be formed, where the TGV structure may include a first conductive film (e.g., the conductive film 172) on a sidewall of a first TGV hole. In some aspects, the first TGV hole may be defined within the glass substrate and extending from the upper surface of the glass substrate to the lower surface of the glass substrate. In some aspects, the first conductive film may be configured to couple the first conductive structure to the second conductive structure.

In some aspects, the method 600 may include forming a plurality of TGV holes within a glass base substrate that corresponds to a glass substrate wafer or a glass substrate panel, the plurality of TGV holes including the first TGV hole and a plurality of second TGV holes, the glass substrate of the antenna apparatus being based on the glass base substrate; forming a plurality of metalized TGV hole structures based on the plurality of second TGV holes; and performing a singulation process cutting through the plurality of metalized TGV hole structures to separate the antenna apparatus from the glass base substrate, a remaining portion of the plurality of metalized TGV hole structures becoming the plurality of metalized recess structures of the side portion of the glass substrate of the antenna apparatus.

In some aspects, the method 600 may further include forming a seed conductive film on an upper surface of the glass base substrate, on a lower surface of the glass base substrate, and on a sidewall of each of the plurality of TGV holes; defining a first seed pattern based on a first portion of the seed conductive film on the upper surface of the glass base substrate; defining a second seed pattern based on a second portion of the seed conductive film on the lower surface of the glass base substrate; and forming an additional conductive film on the first seed pattern, on the second seed pattern, and on a third portion of the seed conductive film on the sidewall of the first TGV hole.

In some aspects, the first seed pattern and a first portion of the additional conductive film on the first seed pattern correspond to the first conductive structure. In some aspects, the second seed pattern and a second portion of the additional conductive film on the second seed pattern correspond to the second conductive structure. In some aspects, the first conductive film includes a first part based on the third portion of the seed conductive film on the sidewall of the first TGV hole and a second part based on a third portion of the additional conductive film on the third portion of the seed conductive film on the sidewall of the first TGV hole. In some aspects, a fourth portion of the seed conductive film on the sidewall of each of the plurality of TGV holes corresponds to the plurality of second conductive films respectively on the recess sidewalls of the plurality of metalized recess structures.

In some aspects, the seed conductive film may be made of a first material comprising titanium, copper, or a combination thereof. In some aspects, the additional conductive film is made of a second material comprising copper. In some aspects, the method 600 may further include forming a dry film dielectric filling a space within the TGV structure surrounded by the first conductive film.

In some aspects, the method 600 may further include forming a first insulating layer on the upper surface and covering at least a portion of the first conductive structure; and forming a second insulating layer on the lower surface and covering at least a portion of the second conductive structure. In some aspects, the first insulating layer or the second insulating layer may include silicon dioxide, an organic polymeric dielectric, polyimide, polynorbornene, benzocyclobutene, polytetrafluoroethylene, a silicone based polymeric dielectric, or any combination thereof.

In some aspects, the method 600 may further include forming a metallization structure under the glass substrate, the metallization structure including at least the second insulating layer and the second conductive structure. In some aspects, the metallization structure may further include a conductive terminal structure electrically coupled to the second conductive structure through an opening of the second insulating layer. In some aspects, the conductive terminal structure corresponds to a solder bump, a copper pillar bump, or a micro ball bump.

A technical advantage of the method 600 may correspond to fabricating an antenna apparatus (e.g., an AOG die) that includes a plurality of metalized recess structures formed on a side portion of the glass substrate of the apparatus. The process of forming the metalized recess structures may be integrated with the process of forming the TGV structures and thus may not significantly increase the complexity of the fabrication process. Meanwhile, the EMI shielding provided by the metalized recess structure may improve the antenna performance (e.g., antenna gain, throughput, and/or bandwidth).

Figure 7:
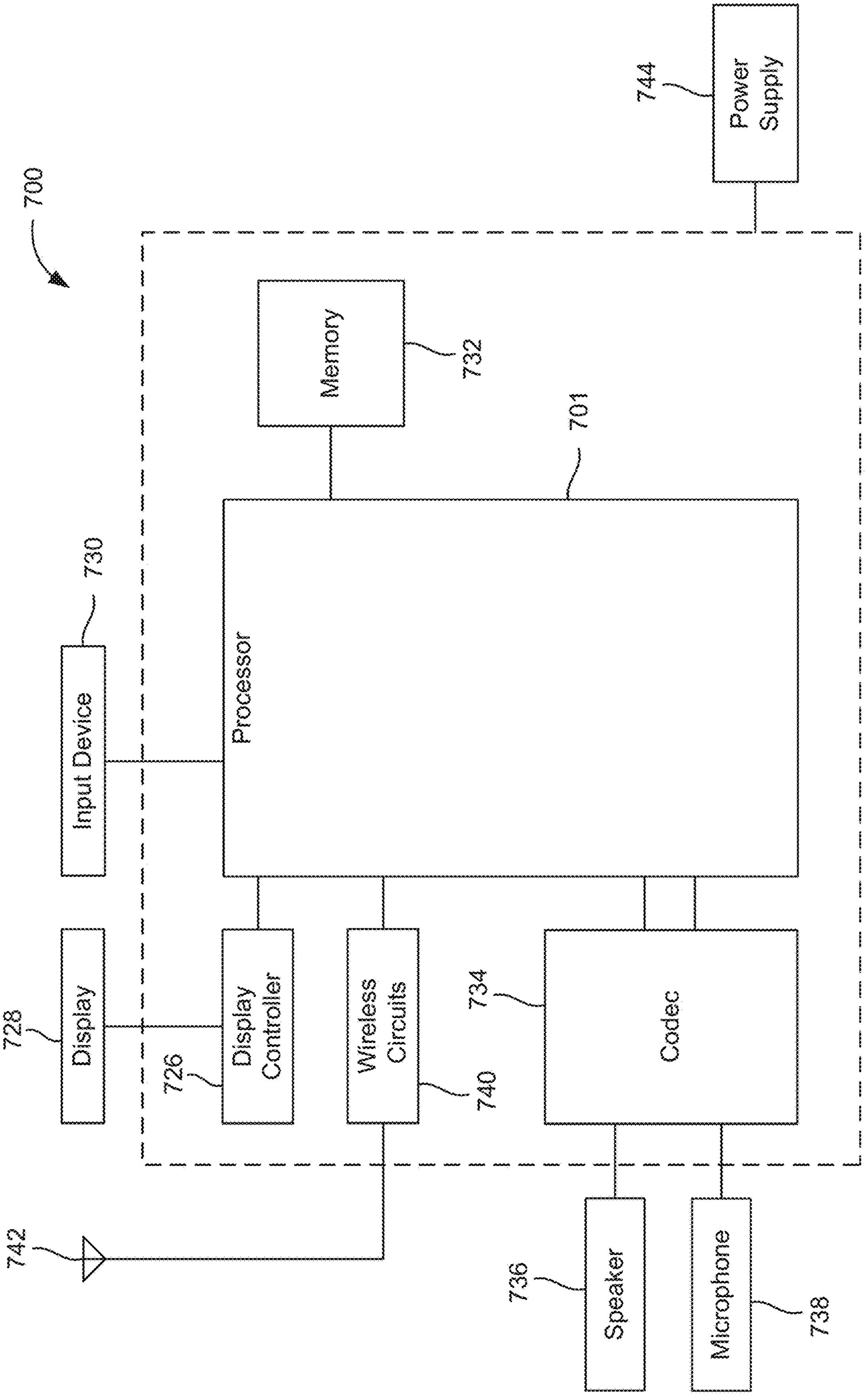
FIG. 7 illustrates a mobile device, according to aspects of the disclosure.

FIG. 7 illustrates a mobile device 700, according to aspects of the disclosure. In some aspects, the mobile device 700 may be implemented by including one or more antenna apparatuses (e.g., AOG dies) as disclosed herein.

In some aspects, mobile device 700 may be configured as a wireless communication device. As shown, mobile device 700 includes processor 701. Processor 701 may be communicatively coupled to memory 732 over a link, which may be a die-to-die or chip-to-chip link. Mobile device 700 also includes display 728 and display controller 726, with display controller 726 coupled to processor 701 and to display 728. The mobile device 700 may include input device 730 (e.g., physical, or virtual keyboard), power supply 744 (e.g., battery), speaker 736, microphone 738, and wireless antenna 742 (which may incorporate an antenna apparatus (e.g., an AOG die) according to various aspects described in this disclosure). In some aspects, the power supply 744 may directly or indirectly provide the supply voltage for operating some or all of the components of the mobile device 700.

In some aspects, FIG. 7 may include coder/decoder (CODEC) 734 (e.g., an audio and/or voice CODEC) coupled to processor 701; speaker 736 and microphone 738 coupled to CODEC 734; and wireless circuits 740 (which may include a modem, RF circuitry, filters, etc.) coupled to wireless antenna 742 and to processor 701. In some aspects, one or more of processor 701 (e.g., SoCs, application processor (AP)), display controller 726, memory 732, CODEC 734, and wireless circuits 740 (e.g., baseband interface) including IC devices that are packaged as IC packages.

It should be noted that although FIG. 7 depicts a mobile device 700, similar architecture may be used to implement an apparatus including a set top box, a music player, a video player, an entertainment unit, a navigation device, a personal digital assistant (PDA), a fixed location data unit, a computer, a laptop, a tablet, a communications device, a mobile phone, or other similar devices.

Figure 8:
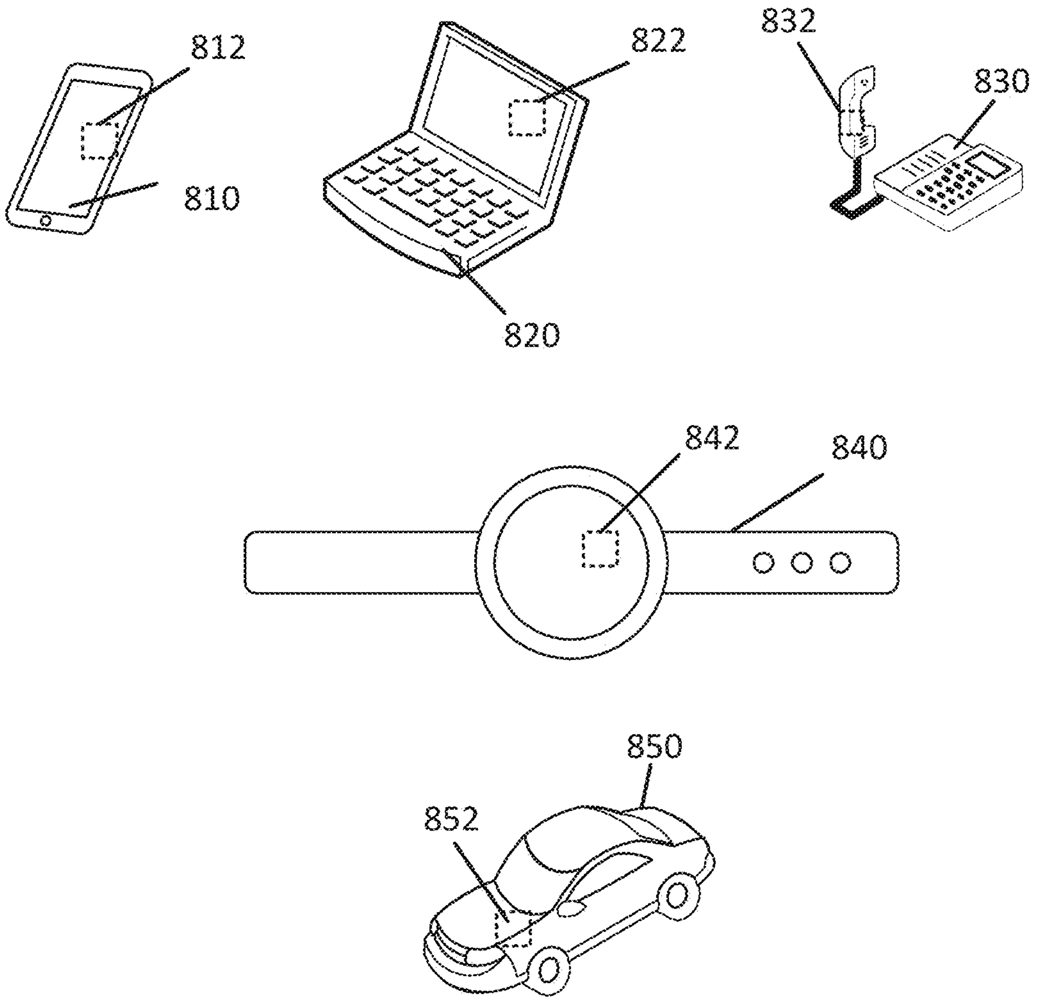
FIG. 8 illustrates various electrical devices that may incorporate an antenna apparatus as described herein, according to aspects of the disclosure.

FIG. 8 illustrates various electrical devices that may incorporate an antenna apparatus as described herein, according to aspects of the disclosure. For example, a mobile phone device 810, a laptop computer device 820, a fixed location terminal device 830, a wearable device 840, or an electrical device onboard an automotive vehicle 850 may respectively include an antenna apparatus 812, 822, 832, 842, and 852 (e.g., corresponding to an AOG die based on the examples described above with reference to FIGS. 1-7). The devices 810, 820, 830, and 840 and the vehicle 850 illustrated in FIG. 8 are merely exemplary. Other apparatuses or devices that may feature the antenna apparatus as described herein may include, but not limited to, a group of devices that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices (e.g., watches, glasses), Internet of things (IoT) devices, servers, routers, electrical devices implemented in automotive vehicles (e.g., autonomous vehicles), or any other device that stores or retrieves data or computer instructions, or any combination thereof.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. An antenna apparatus, comprising: a glass substrate having an upper surface, a lower surface, and a side portion surrounding the glass substrate and connecting the upper surface and the lower surface; a first conductive structure on the upper surface of the glass substrate; a second conductive structure on the lower surface of the glass substrate; and a through-glass via (TGV) structure including a first conductive film on a sidewall of a first TGV hole, the first TGV hole being defined within the glass substrate and extending from the upper surface of the glass substrate to the lower surface of the glass substrate, and the first conductive film being configured to couple the first conductive structure to the second conductive structure, wherein the side portion includes a plurality of metalized recess structures, the plurality of metalized recess structures having recess sidewalls connecting the upper surface and the lower surface and a plurality of second conductive films respectively on the recess sidewalls of the plurality of metalized recess structures, each recess sidewall of the plurality of metalized recess structures having a shape corresponding to a partial TGV hole.

Clause 2. The antenna apparatus of clause 1, wherein a thickness of the first conductive film is greater than a thickness of the plurality of second conductive films.

Clause 3. The antenna apparatus of any of clauses 1 to 2, further comprising: a grounding conductive structure on the upper surface of the glass substrate, the lower surface of the glass substrate, or any combination thereof, wherein the plurality of second conductive films is electrically coupled to the grounding conductive structure.

Clause 4. The antenna apparatus of any of clauses 1 to 3, wherein: the plurality of second conductive films is made of a first material, the first conductive film comprises a first part and a second part, the first part being between the sidewall of the first TGV hole and the second part, the first part is made of the first material, and the second part is made of a second material.

Clause 5. The antenna apparatus of clause 4, wherein: the first material comprises titanium, copper, or a combination thereof, and the second material comprises copper.

Clause 6. The antenna apparatus of any of clauses 4 to 5, wherein the first conductive structure or the second conductive structure comprises at least a third part made of the first material and a fourth part made of the second material.

Clause 7. The antenna apparatus of any of clauses 1 to 6, further comprising: a first insulating layer disposed on the upper surface and covering at least a portion of the first conductive structure; and a second insulating layer disposed on the lower surface and covering at least a portion of the second conductive structure.

Clause 8. The antenna apparatus of clause 7, wherein the first insulating layer or the second insulating layer comprises silicon dioxide, an organic polymeric dielectric, polyimide, polynorbornene, benzocyclobutene, polytetrafluoroethylene, a silicone based polymeric dielectric, or any combination thereof.

Clause 9. The antenna apparatus of any of clauses 7 to 8, further comprising: a metallization structure under the glass substrate, the metallization structure including at least the second insulating layer and the second conductive structure, wherein the metallization structure further includes a conductive terminal structure electrically coupled to the second conductive structure through an opening of the second insulating layer.

Clause 10. The antenna apparatus of clause 9, wherein the conductive terminal structure corresponds to a solder bump, a copper pillar bump, or a micro ball bump.

Clause 11. The antenna apparatus of any of clauses 1 to 10, further comprising a dry film dielectric filling a space within the TGV structure surrounded by the first conductive film.

Clause 12. The antenna apparatus of any of clauses 1 to 11, wherein the first conductive structure is configured as a patch antenna.

Clause 13. A method of fabricating an antenna apparatus, comprising: forming a first conductive structure on an upper surface of a glass substrate, the glass substrate having the upper surface, a lower surface, and a side portion surrounding the glass substrate and connecting the upper surface and the lower surface; forming a second conductive structure on the lower surface of the glass substrate; and forming a through-glass via (TGV) structure including a first conductive film on a sidewall of a first TGV hole, the first TGV hole being defined within the glass substrate and extending from the upper surface of the glass substrate to the lower surface of the glass substrate, and the first conductive film being configured to couple the first conductive structure to the second conductive structure, wherein the side portion includes a plurality of metalized recess structures, the plurality of metalized recess structures having recess sidewalls connecting the upper surface and the lower surface and a plurality of second conductive films respectively on the recess sidewalls of the plurality of metalized recess structures, each recess sidewall of the plurality of metalized recess structures having a shape corresponding to a partial TGV hole.

Clause 14. The method of clause 13, further comprising: forming a grounding conductive structure on the upper surface of the glass substrate, the lower surface of the glass substrate, or any combination thereof, wherein the plurality of second conductive films is electrically coupled to the grounding conductive structure.

Clause 15. The method of any of clauses 13 to 14, further comprising: forming a plurality of TGV holes within a glass base substrate that corresponds to a glass substrate wafer or a glass substrate panel, the plurality of TGV holes including the first TGV hole and a plurality of second TGV holes, the glass substrate of the antenna apparatus being based on the glass base substrate; forming a plurality of metalized TGV hole structures based on the plurality of second TGV holes; and performing a singulation process cutting through the plurality of metalized TGV hole structures to separate the antenna apparatus from the glass base substrate, a remaining portion of the plurality of metalized TGV hole structures becoming the plurality of metalized recess structures of the side portion of the glass substrate of the antenna apparatus.

Clause 16. The method of clause 15, further comprising: forming a seed conductive film on an upper surface of the glass base substrate, on a lower surface of the glass base substrate, and on a sidewall of each of the plurality of TGV holes; defining a first seed pattern based on a first portion of the seed conductive film on the upper surface of the glass base substrate; defining a second seed pattern based on a second portion of the seed conductive film on the lower surface of the glass base substrate; and forming an additional conductive film on the first seed pattern, on the second seed pattern, and on a third portion of the seed conductive film on the sidewall of the first TGV hole, wherein: the first seed pattern and a first portion of the additional conductive film on the first seed pattern correspond to the first conductive structure, the second seed pattern and a second portion of the additional conductive film on the second seed pattern correspond to the second conductive structure, the first conductive film includes a first part based on the third portion of the seed conductive film on the sidewall of the first TGV hole and a second part based on a third portion of the additional conductive film on the third portion of the seed conductive film on the sidewall of the first TGV hole, and a fourth portion of the seed conductive film on the sidewall of each of the plurality of TGV holes corresponds to the plurality of second conductive films respectively on the recess sidewalls of the plurality of metalized recess structures.

Clause 17. The method of clause 16, wherein: the seed conductive film is made of a first material comprising titanium, copper, or a combination thereof, and the additional conductive film is made of a second material comprising copper.

Clause 18. The method of any of clauses 13 to 17, further comprising: forming a first insulating layer on the upper surface and covering at least a portion of the first conductive structure; and forming a second insulating layer on the lower surface and covering at least a portion of the second conductive structure.

Clause 19. The method of clause 18, wherein the first insulating layer or the second insulating layer comprises silicon dioxide, an organic polymeric dielectric, polyimide, polynorbornene, benzocyclobutene, polytetrafluoroethylene, a silicone based polymeric dielectric, or any combination thereof.

Clause 20. The method of any of clauses 18 to 19, further comprising: forming a metallization structure under the glass substrate, the metallization structure including at least the second insulating layer and the second conductive structure, wherein the metallization structure further includes a conductive terminal structure electrically coupled to the second conductive structure through an opening of the second insulating layer.

Clause 21. The method of clause 20, wherein the conductive terminal structure corresponds to a solder bump, a copper pillar bump, or a micro ball bump.

Clause 22. The method of any of clauses 13 to 21, further comprising forming a dry film dielectric filling a space within the TGV structure surrounded by the first conductive film.

Clause 23. The method of any of clauses 13 to 22, wherein the first conductive structure is configured as a patch antenna.

Clause 24. An electrical device, comprising: one or more processor; and an antenna apparatus coupled to the one or more processor, wherein the antenna apparatus comprises: a glass substrate having an upper surface, a lower surface, and a side portion surrounding the glass substrate and connecting the upper surface and the lower surface; a first conductive structure on the upper surface of the glass substrate; a second conductive structure on the lower surface of the glass substrate; and a through-glass via (TGV) structure including a first conductive film on a sidewall of a first TGV hole, the first TGV hole being defined within the glass substrate and extending from the upper surface of the glass substrate to the lower surface of the glass substrate, and the first conductive film being configured to couple the first conductive structure to the second conductive structure, wherein the side portion includes a plurality of metalized recess structures, the plurality of metalized recess structures having recess sidewalls connecting the upper surface and the lower surface and a plurality of second conductive films respectively on the recess sidewalls of the plurality of metalized recess structures, each recess sidewall of the plurality of metalized recess structures having a shape corresponding to a partial TGV hole.

Clause 25. The electrical device of clause 24, wherein a thickness of the first conductive film is greater than a thickness of the plurality of second conductive films.

Clause 26. The electrical device of any of clauses 24 to 25, wherein the antenna apparatus further comprises: a grounding conductive structure on the upper surface of the glass substrate, the lower surface of the glass substrate, or any combination thereof, wherein the plurality of second conductive films is electrically coupled to the grounding conductive structure.

Clause 27. The electrical device of any of clauses 24 to 26, wherein: the plurality of second conductive films is made of a first material, the first conductive film comprises a first part and a second part, the first part being between the sidewall of the first TGV hole and the second part, the first part is made of the first material, and the second part is made of a second material.

Clause 28. The electrical device of clause 27, wherein: the first material comprises titanium, copper, or a combination thereof, and the second material comprises copper.

Clause 29. The electrical device of any of clauses 27 to 28, wherein the first conductive structure or the second conductive structure comprises at least a first part made of the first material and a second part made of the second material.

Clause 30. The electrical device of any of clauses 24 to 29, wherein the antenna apparatus further comprises: a first insulating layer disposed on the upper surface and covering at least a portion of the first conductive structure; and a second insulating layer disposed on the lower surface and covering at least a portion of the second conductive structure.

Clause 31. The electrical device of clause 30, wherein the first insulating layer or the second insulating layer comprises silicon dioxide, an organic polymeric dielectric, polyimide, polynorbornene, benzocyclobutene, polytetrafluoroethylene, a silicone based polymeric dielectric, or any combination thereof.

Clause 32. The electrical device of any of clauses 30 to 31, wherein the antenna apparatus further comprises: a metallization structure under the glass substrate, the metallization structure including at least the second insulating layer and the second conductive structure, wherein the metallization structure further includes a conductive terminal structure electrically coupled to the second conductive structure through an opening of the second insulating layer.

Clause 33. The electrical device of clause 32, wherein the conductive terminal structure corresponds to a solder bump, a copper pillar bump, or a micro ball bump.

Clause 34. The electrical device of any of clauses 24 to 33, wherein the antenna apparatus further comprises a dry film dielectric filling a space within the TGV structure surrounded by the first conductive film.

Clause 35. The electrical device of any of clauses 24 to 34, wherein the first conductive structure is configured as a patch antenna.

Clause 36. The electrical device of any of clauses 24 to 35, wherein the electrical device comprises at least one of: a music player, a video player, an entertainment unit; a navigation device, a communications device, a mobile device, a mobile phone, a smartphone, a personal digital assistant, a fixed location terminal, a tablet computer, a computer, a wearable device, a laptop computer, a server, an internet of things (IoT) device, or a device in an automotive vehicle.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. An antenna apparatus, comprising:
a glass substrate having an upper surface, a lower surface, and a side portion surrounding the glass substrate and connecting the upper surface and the lower surface;
a first conductive structure on the upper surface of the glass substrate;
a second conductive structure on the lower surface of the glass substrate; and
a through-glass via (TGV) structure including a first conductive film on a sidewall of a first TGV hole,
the first TGV hole being defined within the glass substrate and extending from the upper surface of the glass substrate to the lower surface of the glass substrate, and
the first conductive film being configured to couple the first conductive structure to the second conductive structure,
wherein the side portion includes a plurality of metalized recess structures, the plurality of metalized recess structures having recess sidewalls connecting the upper surface and the lower surface and a plurality of second conductive films respectively on the recess sidewalls of the plurality of metalized recess structures, each recess sidewall of the plurality of metalized recess structures having a shape corresponding to a partial TGV hole.

2. The antenna apparatus of claim 1, wherein a thickness of the first conductive film is greater than a thickness of the plurality of second conductive films.

3. The antenna apparatus of claim 1, further comprising:
a grounding conductive structure on the upper surface of the glass substrate, the lower surface of the glass substrate, or any combination thereof,
wherein the plurality of second conductive films is electrically coupled to the grounding conductive structure.

4. The antenna apparatus of claim 1, wherein:
the plurality of second conductive films is made of a first material,
the first conductive film comprises a first part and a second part, the first part being between the sidewall of the first TGV hole and the second part,
the first part is made of the first material, and
the second part is made of a second material.

5. The antenna apparatus of claim 4, wherein:
the first material comprises titanium, copper, or a combination thereof, and
the second material comprises copper.

6. The antenna apparatus of claim 4, wherein the first conductive structure or the second conductive structure comprises at least a third part made of the first material and a fourth part made of the second material.

7. The antenna apparatus of claim 1, further comprising:
a first insulating layer disposed on the upper surface and covering at least a portion of the first conductive structure; and
a second insulating layer disposed on the lower surface and covering at least a portion of the second conductive structure.

8. The antenna apparatus of claim 7, wherein the first insulating layer or the second insulating layer comprises silicon dioxide, an organic polymeric dielectric, polyimide, polynorbornene, benzocyclobutene, polytetrafluoroethylene, a silicone based polymeric dielectric, or any combination thereof.

9. The antenna apparatus of claim 7, further comprising:
a metallization structure under the glass substrate, the metallization structure including at least the second insulating layer and the second conductive structure,
wherein the metallization structure further includes a conductive terminal structure electrically coupled to the second conductive structure through an opening of the second insulating layer.

10. The antenna apparatus of claim 9, wherein the conductive terminal structure corresponds to a solder bump, a copper pillar bump, or a micro ball bump.

11. The antenna apparatus of claim 1, further comprising a dry film dielectric filling a space within the TGV structure surrounded by the first conductive film.

12. The antenna apparatus of claim 1, wherein the first conductive structure is configured as a patch antenna.

13. A method of fabricating an antenna apparatus, comprising:
forming a first conductive structure on an upper surface of a glass substrate, the glass substrate having the upper surface, a lower surface, and a side portion surrounding the glass substrate and connecting the upper surface and the lower surface;
forming a second conductive structure on the lower surface of the glass substrate; and
forming a through-glass via (TGV) structure including a first conductive film on a sidewall of a first TGV hole,
the first TGV hole being defined within the glass substrate and extending from the upper surface of the glass substrate to the lower surface of the glass substrate, and
the first conductive film being configured to couple the first conductive structure to the second conductive structure,
wherein the side portion includes a plurality of metalized recess structures, the plurality of metalized recess structures having recess sidewalls connecting the upper surface and the lower surface and a plurality of second conductive films respectively on the recess sidewalls of the plurality of metalized recess structures, each recess sidewall of the plurality of metalized recess structures having a shape corresponding to a partial TGV hole.

14. The method of claim 13, further comprising:
forming a grounding conductive structure on the upper surface of the glass substrate, the lower surface of the glass substrate, or any combination thereof,
wherein the plurality of second conductive films is electrically coupled to the grounding conductive structure.

15. The method of claim 13, further comprising:
forming a plurality of TGV holes within a glass base substrate that corresponds to a glass substrate wafer or a glass substrate panel, the plurality of TGV holes including the first TGV hole and a plurality of second TGV holes, the glass substrate of the antenna apparatus being based on the glass base substrate;
forming a plurality of metalized TGV hole structures based on the plurality of second TGV holes; and performing a singulation process cutting through the plurality of metalized TGV hole structures to separate the antenna apparatus from the glass base substrate, a remaining portion of the plurality of metalized TGV hole structures becoming the plurality of metalized recess structures of the side portion of the glass substrate of the antenna apparatus.

16. The method of claim 15, further comprising:

forming a seed conductive film on an upper surface of the glass base substrate, on a lower surface of the glass base substrate, and on a sidewall of each of the plurality of TGV holes;

defining a first seed pattern based on a first portion of the seed conductive film on the upper surface of the glass base substrate;

defining a second seed pattern based on a second portion of the seed conductive film on the lower surface of the glass base substrate; and forming an additional conductive film on the first seed pattern, on the second seed pattern, and on a third portion of the seed conductive film on the sidewall of the first TGV hole, wherein:

the first seed pattern and a first portion of the additional conductive film on the first seed pattern correspond to the first conductive structure, the second seed pattern and a second portion of the additional conductive film on the second seed pattern correspond to the second conductive structure, the first conductive film includes a first part based on the third portion of the seed conductive film on the sidewall of the first TGV hole and a second part based on a third portion of the additional conductive film on the third portion of the seed conductive film on the sidewall of the first TGV hole, and a fourth portion of the seed conductive film on the sidewall of each of the plurality of TGV holes corresponds to the plurality of second conductive films respectively on the recess sidewalls of the plurality of metalized recess structures.

17. An electrical device, comprising:

one or more processor; and an antenna apparatus coupled to the one or more processor, wherein the antenna apparatus comprises:

a glass substrate having an upper surface, a lower surface, and a side portion surrounding the glass substrate and connecting the upper surface and the lower surface;

a first conductive structure on the upper surface of the glass substrate;

a second conductive structure on the lower surface of the glass substrate; and a through-glass via (TGV) structure including a first conductive film on a sidewall of a first TGV hole, the first TGV hole being defined within the glass substrate and extending from the upper surface of the glass substrate to the lower surface of the glass substrate, and the first conductive film being configured to couple the first conductive structure to the second conductive structure, wherein the side portion includes a plurality of metalized recess structures, the plurality of metalized recess structures having recess sidewalls connecting the upper surface and the lower surface and a plurality of second conductive films respectively on the recess sidewalls of the plurality of metalized recess structures, each recess sidewall of the plurality of metalized recess structures having a shape corresponding to a partial TGV hole.

18. The electrical device of claim 17, wherein a thickness of the first conductive film is greater than a thickness of the plurality of second conductive films.

19. The electrical device of claim 17, wherein the antenna apparatus further comprises:

a grounding conductive structure on the upper surface of the glass substrate, the lower surface of the glass substrate, or any combination thereof, wherein the plurality of second conductive films is electrically coupled to the grounding conductive structure.

20. The electrical device of claim 17, wherein the electrical device comprises at least one of: a music player, a video player, an entertainment unit; a navigation device, a communications device, a mobile device, a mobile phone, a smartphone, a personal digital assistant, a fixed location terminal, a tablet computer, a computer, a wearable device, a laptop computer, a server, an internet of things (IoT) device, or a device in an automotive vehicle.

* * * * *